United States Patent
Ahn et al.

(10) Patent No.: US 10,290,862 B2
(45) Date of Patent: May 14, 2019

(54) COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Sungjin Ahn, Anyang-si (KR); Byongyong Yu, Suwon-si (KR); Jayhyok Song, Suwon-si (KR); Andrei Kapylou, Suwon-si (KR); Jinhwan Park, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 293 days.

(21) Appl. No.: 15/181,838

(22) Filed: Jun. 14, 2016

(65) Prior Publication Data
US 2017/0194637 A1     Jul. 6, 2017

(30) Foreign Application Priority Data

Dec. 31, 2015   (KR) .................. 10-2015-0191026

(51) Int. Cl.
*H01M 4/36*     (2006.01)
*H01M 4/505*    (2010.01)
(Continued)

(52) U.S. Cl.
CPC ............ *H01M 4/364* (2013.01); *C01G 53/50* (2013.01); *H01M 4/0471* (2013.01);
(Continued)

(58) Field of Classification Search
CPC .... H01M 4/0471; H01M 4/364; H01M 4/366; H01M 4/505; H01M 4/525
(Continued)

(56) References Cited

U.S. PATENT DOCUMENTS 6,242,134 B1   6/2001   Fujiwara et al.
8,802,291 B2   8/2014   Li et al.
(Continued)

FOREIGN PATENT DOCUMENTS

JP   2006-073482 A   3/2006
JP   4954451 B2      3/2012
(Continued)

OTHER PUBLICATIONS

Thackeray et al. Li2MnO3-stabilized LiMO2 (M=Mn, Ni, Co) electrodes for lithium-ion batteries. J. Mater. Chem. vol. 17, 2007, pp. 3112-3125 [online], [retrieved on Apr. 18, 2018]. Retrieved from the Internet <URL: http://pubs.rsc.org/en/content/articlepdf/2007/JM/B702425H> (Year: 2007).*
(Continued)

*Primary Examiner* — James M Erwin
(74) *Attorney, Agent, or Firm* — Cantor Colburn LLP

(57) ABSTRACT

A composite cathode active material includes: a first metal oxide including a plurality of layered crystalline phases comprising a first layered crystalline phase and a second layered crystalline phase, wherein the first and second layered crystalline phases have a different compositions than each other, and a second metal oxide different from the first metal oxide and including a composite crystalline phase, that is different from the first metal oxide, wherein the second metal oxide is represented by Formula 1, wherein at least a portion of the second metal oxide is disposed on a first layered crystalline phase of the plurality of layered crystal-
(Continued)

line phases of the first metal oxide, and wherein the first layer crystalline phase is in a space group of R-3m:

$$Li_xM_yO_z \quad \text{Formula 1}$$

wherein, in Formula 1, $0 \leq x \leq 3$, $1 \leq y \leq 3$, and $2 \leq z \leq 8$, and M is at least one selected from a Group 4 element to a Group 13 element.

20 Claims, 13 Drawing Sheets

(51) Int. Cl.
| | |
|---|---|
| H01M 4/525 | (2010.01) |
| H01M 4/04 | (2006.01) |
| H01M 4/131 | (2010.01) |
| C01G 53/00 | (2006.01) |
| H01M 10/0525 | (2010.01) |
| H01M 4/02 | (2006.01) |

(52) U.S. Cl.
CPC .......... *H01M 4/131* (2013.01); *H01M 4/366* (2013.01); *H01M 4/505* (2013.01); *H01M 4/525* (2013.01); *C01P 2002/20* (2013.01); *C01P 2002/72* (2013.01); *C01P 2002/76* (2013.01); *C01P 2002/85* (2013.01); *C01P 2004/03* (2013.01); *C01P 2004/04* (2013.01); *C01P 2004/64* (2013.01); *C01P 2006/40* (2013.01); *H01M 10/0525* (2013.01); *H01M 2004/028* (2013.01)

(58) Field of Classification Search
USPC ....................................... 429/223
See application file for complete search history.

(56) References Cited

U.S. PATENT DOCUMENTS

| | | | |
|---|---|---|---|
| 2014/0087261 A1* | 3/2014 | Li | H01M 4/485 429/223 |
| 2014/0193708 A1 | 7/2014 | Han et al. | |
| 2014/0377659 A1* | 12/2014 | Oljaca | H01M 4/0416 429/221 |
| 2015/0228969 A1 | 8/2015 | Cho et al. | |
| 2016/0380263 A1 | 12/2016 | Nakayama et al. | |

FOREIGN PATENT DOCUMENTS

| | | |
|---|---|---|
| JP | 5145994 B2 | 12/2012 |
| JP | 5614334 B2 | 9/2014 |
| KR | 1020100109605 A | 10/2010 |
| KR | 1020140081663 A | 7/2014 |
| KR | 1020140087373 A | 7/2014 |
| KR | 1020140089244 A | 7/2014 |
| KR | 10-1458676 B1 | 10/2014 |
| KR | 1020150065979 A | 6/2015 |
| WO | 2015011174 A1 | 1/2015 |
| WO | 2015111740 A1 | 7/2015 |

OTHER PUBLICATIONS

Shin et al., "Effect of Li2CO3 additive on gas generation in lithium-ion batteries", Journal of Power Sources, 109, 2002, pp. 47-52.

* cited by examiner

COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

CROSS-REFERENCE TO RELATED APPLICATION

This application claims priority to and the benefit of Korean Patent Application No. 10-2015-0191026, filed on Dec. 31, 2015, in the Korean Intellectual Property Office, and all the benefits accruing therefrom under 35 U.S.C. § 119, the content of which is incorporated herein by reference in its entirety.

BACKGROUND

1. Field

The present disclosure relates to a composite cathode active material, a cathode, and a lithium battery that include the composite cathode active material, and a method of preparing the composite cathode active material.

2. Description of the Related Art

To accord with various devices that are subjected to miniaturization and high performance, lithium batteries having high energy density as well as miniaturization and weight reduction are desired. To implement lithium batteries that satisfy the use described above, cathode active materials having a high capacity have been considered.

Nickel-based cathode active materials having a high capacity as described in the related art may be a cause of a side reaction with an electrolyte which occurs when cracks are formed in the cathode active materials during a charging/discharging process. Accordingly, by-products, such as transition metals and gas eluted from the cathode active materials, are produced. The side reaction occurring in the cathode active materials and by-products produced by the cathode active materials, may lead to deterioration of battery performance including a decrease in the high rate characteristics and lifespan characteristics of the battery. Therefore, there is a need for a method of preventing deterioration of battery performance while including a high-capacity cathode active material in a battery.

SUMMARY

Provided is a novel composite cathode active material having a high capacity and which is capable of preventing a deterioration in battery performance.

Provided is a cathode including the composite cathode active material.

Provided is a lithium battery including the cathode.

Provided is a method of preparing the composite cathode active material.

According to an aspect of an embodiment, a composite cathode active material includes: a first metal oxide including a plurality of layered crystalline phases including a first layered crystalline phase and a second layered crystalline phase, wherein the first and second layered crystalline phases have a different compositions than each other; and a second metal oxide including a composite crystalline phase, wherein the composite crystalline phase is different from at least one of the plurality of layered crystalline phases of the first metal oxide, and wherein the second metal oxide is represented by Formula 1, wherein at least a portion of the second metal oxide may be disposed on a first layered crystalline phase of the plurality of layered crystalline phases, and wherein the first layered crystalline phase is in a space group of R-3m:

$$Li_xM_yO_z \quad \text{Formula 1}$$

wherein, in Formula 1, $0 \leq x \leq 3$, $1 \leq y \leq 3$, and $2 \leq z \leq 8$, and M may be at least one selected from a Group 4 element to a Group 18 element.

According to an aspect of another embodiment, a cathode includes the composite cathode active material.

According to an aspect of another embodiment, a lithium battery includes the cathode.

According to an aspect of another embodiment, a method of preparing the composite cathode active material includes: providing a first metal oxide including a plurality of layered crystalline phases including a first layered crystalline phase and a second layered crystalline phase, wherein the first and second layered crystalline phases have different compositions than each other; combining the first metal oxide and a precursor of a second metal oxide to form a mixture, wherein the precursor is represented by Formula 1; drying the mixture; and heat-treating the dried mixture to form the composite cathode active material:

$$Li_xM_yO_z \quad \text{Formula 1}$$

wherein, in Formula 1, $0 \leq x \leq 3$, $1 \leq y \leq 3$, and $2 \leq z \leq 8$, and M may be at least one selected from a Group 4 element to a Group 13 element.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
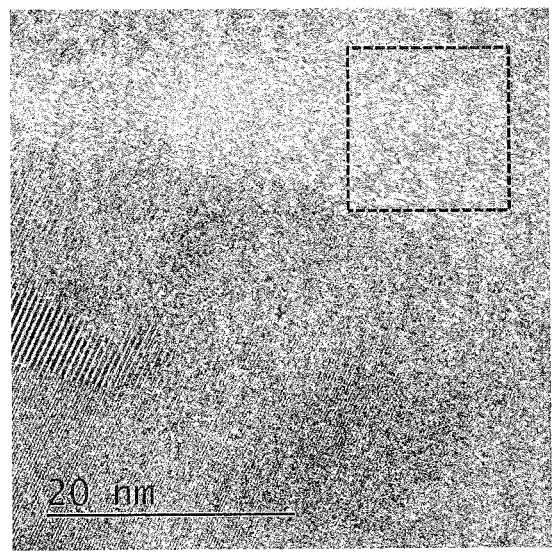
FIG. 1A is a high resolution transmission electron microscopic (HR-TEM) image showing a surface of a composite cathode active material prepared in Example 16.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite cathode active material according to an embodiment, a method of preparing the composite cathode active material, and a cathode and a lithium battery that include the composite cathode active material will be described in detail.

According to an embodiment of the present disclosure, a composite cathode active material may include: a first metal oxide and a second metal oxide, the first metal oxide having a plurality of layered crystalline phases comprising a first layered crystalline phase and a second layered crystalline phase, wherein the first and second layered crystalline phases have a different compositions than each other. In an embodiment, each layered crystalline phase of the plurality of layered crystalline phases has a different composition than any other layered crystalline phase of the plurality of layered crystalline phases. The second metal oxide has a composite crystalline structure, e.g., a composite crystalline phase, that is different from at least one of the plurality of layered crystalline phases of the first metal oxide, and is represented by Formula 1, wherein at least a portion of the second metal oxide is disposed on a surface of a first layered crystalline phase of the plurality of layered crystalline phases of the first metal oxide, and the first layer crystalline phase in a space group of R-3m, of the first metal oxide:

$$Li_xM_yO_z \qquad \text{Formula 1}$$

wherein, in Formula 1, 0≤x≤3, 1≤y≤3, and 2≤z≤8, and M is at least one selected from a Group 4 element to a Group 13 element.

The composite cathode active material includes the second metal oxide so that the composite cathode active material may have improved structural stability. In addition, generation of cracks in the composite cathode active material associated with the first metal oxide during charge-discharge cycles of a battery may be suppressed so that a side reaction with an electrolyte may be reduced, thereby preventing generation of gas by a lithium battery including the composite cathode active material and preventing deterioration of charge-discharge properties of a lithium battery including the composite cathode active material. In addition, the second metal oxide is formed by a reaction between residual lithium present on a surface of the composite cathode active material and a precursor of the second metal oxide. Thus, the amount of free lithium present inside the composite cathode active material and on a surface of the composite cathode active material may be reduced, thereby suppressing a side reaction between the composite cathode active material and an electrolyte. Residual lithium may be present on the first layered crystalline phase belonging to the space group R-3m of the first metal oxide, and thus a precursor of the second metal oxide may react with the residual lithium, thereby forming a second metal oxide. Accordingly, at least a portion of the second metal oxide may be disposed on the first layered crystalline phase belonging to the space group of R-3m.

In the composite cathode active material, the second metal oxide including a composite crystalline phase may be disposed on a surface of a particle of the composite cathode active material. When the second metal oxide is disposed on a surface of the composite cathode active material particle, a side reaction between the composite cathode active material and an electrolyte may be efficiently blocked. The second metal oxide may be disposed on the surface of the composite cathode active material particle in a homogeneous manner or in an irregular island-type manner. The second metal oxide may be homogeneously or non-homogeneously disposed on the entire surface of the composite cathode active material. For example, the second metal oxide may form a coating layer which may be a continuous or a non-continuous coating layer. For example, a size, e.g., a dimension, such as a length or width dimension, such as a dimension along a major surface of the of the composite crystalline phase of the second metal oxide, the composite crystalline phase being disposed on the grain surface of the composite cathode active material, may be less than or equal to about 100 nanometers (nm). For example, the size of the composite crystalline phase of the second metal oxide, the composite crystalline phase being disposed on the particle surface of the composite cathode active material, may be in a range of about 1 nm to about 100 nm. For example, the size of the composite crystalline phase of the second metal oxide, the composite crystalline phase being disposed on the particle surface of the composite cathode active material, may be in a range of about 2 nm to about 80 nm. For example, the size of the composite crystalline phase of the second metal oxide, the composite crystalline phase being disposed on the particle surface of the composite cathode active material, may be in a range of about 5 nm to about 60 nm. For example, the size of the composite crystalline phase of the second metal oxide, the composite crystalline phase being disposed on the particle surface of the composite cathode active material, may be in a range of about 10 nm to about 40 nm.

In the composite cathode active material, the second metal oxide including the composite crystalline phase may be disposed at a grain boundary inside the particle of the composite cathode active material. That is, the second metal oxide including the composite crystalline phase may be disposed between grains (e.g. crystallites) of the first metal oxide. When the second metal oxide is disposed at the grain boundary of the first metal oxide and inside the particle of the composite cathode active material, a side reaction between the composite cathode active material and an electrolyte may be efficiently blocked. The second metal oxide may be disposed at the grain boundary within the composite cathode active material in a homogeneous manner or in an irregular island-type manner. The second metal oxide may be homogeneously or non-homogeneously disposed at the grain boundary within the composite cathode active material. For example, a size the crystalline phase of the second metal oxide, the composite crystalline phase being disposed at the grain boundary inside the particle of the composite cathode active material, may be less than or equal to about 100 nm. For example, the size, e.g., dimension, such as an average largest diameter of the composite cathode active material of the second metal oxide, the composite crystalline phase being disposed at the grain boundary inside the particle of the composite cathode active material, may be in a range of about 1 nm to about 100 nm. For example, the size of the composite cathode active material of the second metal oxide, the composite crystalline phase being disposed at the grain boundary inside the particle of the composite cathode active material, may be in a range of about 2 nm to about 80 nm. For example, the size of the composite cathode active material of the second metal oxide, the composite crystalline phase being disposed at the grain boundary inside the particle of the composite cathode active material, may be in a range of about 5 nm to about 60 nm. For example, the size of the composite cathode active material of the second metal oxide, the composite crystalline phase being disposed at the grain boundary inside the particle of the composite cathode active material, may be in a range of about 10 nm to about 40 nm.

The composite cathode active material may be a porous particle including a plurality of pores therein. The plurality of pores may be within the composite cathode active material (e.g. internal pores) and may have a spherical or a non-spherical (e.g., irregular) shape. When the pores have a spherical shape, the size of the pore may be referred to as the diameter of the pore. As used herein, the diameter is also used to refer to a longest distance between two points on a surface of the pore when the pores have a non-spherical or irregular shape. Due to the plurality of pores in the composite cathode active material, the composite cathode active material may more efficiently endure a structural change during a charge-discharge cycle of a battery. For example, a diameter of the pores disposed inside the particle of the composite cathode active material may be less than or equal to about 500 nm. For example, the diameter of the pores inside the particle of the composite cathode active material may be in a range of about 10 nm to about 500 nm. For example, the diameter of the pores inside the particle of the composite cathode active material may be in a range of about 50 nm to about 400 nm. For example, the diameter of the pores inside the particle of the composite cathode active material may be in a range of about 50 nm to about 300 nm.

For example, the diameter of the pores inside the particle of the composite cathode active material may be in a range of about 50 nm to about 200 nm.

The second metal oxide including the composite crystalline phase may be disposed in the pores inside the composite cathode active material. In this regard, the generation of cracks in the composite cathode active material may be suppressed, and a side reaction with an electrolyte may be suppressed.

An amount of the residual lithium in the composite cathode active material may be about 3,000 parts per million (ppm) or less. The amount of the residual lithium refers to an amount of unreacted lithium which is calculated based on total amounts of $Li_2CO_3$ and LiOH that are present in the composite cathode active material. For example, the amount of the residual lithium in the composite cathode active material may be less than or equal to about 3,000 ppm. For example, the amount of the residual lithium in the composite cathode active material may be less than or equal to about 2,500 ppm. For example, the amount of the residual lithium in the composite cathode active material may be less than or equal to about 2,000 ppm. For example, the amount of the residual lithium in the composite cathode active material may be less than or equal to about 1,500 ppm. For example, the amount of the residual lithium in the composite cathode active material may be less than or equal to about 1,000 ppm. For example, the amount of the residual lithium in the composite cathode active material may be less than or equal to about 900 ppm. For example, the amount of the residual lithium in the composite cathode active material may be less than or equal to about 800 ppm. The smaller the amount of the residual lithium in the composite cathode active material, the more the side reaction between the composite cathode active material and an electrolyte is suppressed. Accordingly, gas generation in the composite cathode active material may be suppressed.

In the composite cathode active material, an amount of metal in the second metal oxide may be in a range of about 0.01 mole percent (mol %) to about 3 mol % based on a total amount of the transition metals in the first metal oxide. The metal in the second metal oxide may be a metal represented by M in Formula 1. For example, in the composite cathode active material, the amount of the metal in the second metal oxide may be in a range of about 0.01 mol % to about 2 mol % based on a total amount of transition metals in the first metal oxide. For example, in the composite cathode active material, the amount of the metal in the second metal oxide may be in a range of about 0.01 mol % to about 1 mol % based on a total amount of transition metals in the first metal oxide. For example, in the composite cathode active material, the amount of the metal in the second metal oxide may be in a range of about 0.01 mol % to about 3 mol % based on a total amount of transition metals in the first metal oxide. For example, in the composite cathode active material, the amount of the metal in the second metal oxide may be in a range of about 0.05 mol % to about 0.9 mol % based on a total amount of transition metals in the first metal oxide. For example, in the composite cathode active material, the amount of the metal in the second metal oxide may be in a range of about 0.1 mol % to about 0.9 mol % based on a total amount of transition metals in the first metal oxide. For example, in the composite cathode active material, the amount of the metal in the second metal oxide may be in a range of about 0.05 mol % to about 0.9 mol % based on a total amount of transition metals in the first metal oxide. For example, in the composite cathode active material, the amount of the metal in the second metal oxide may be in a range of about 0.2 mol % to about 0.9 mol % based on a total amount of transition metals in the first metal oxide. When the metal in the second metal oxide is within the amounts recited above, a lithium battery may exhibit further improved performance.

In the composite cathode active material, the first metal oxide may be represented by Formula 2:

$$Li_aNi_bCo_cMn_dO_2 \qquad \text{Formula 2}$$

wherein, in Formula 2, 0≤a≤1.2, 0.7<b<1.0, 0<c<0.3, and 0<d<0.3. For example, in Formula 2, 0≤a≤1.05, 0.7<b<0.9, 0<c<0.2, and 0<d<0.2. For example, in Formula 2, 1.05≤a≤1.13, 0.7<b<0.9, 0<c<0.2, and 0<d<0.2. For example, in Formula 2, a+b+c+d may be 2.

In the composite cathode active material, the first metal oxide may include a first layered crystalline phase belonging to (e.g., existing in) a space group of R-3m and a second layered crystalline phase belonging to a space group of C2/m. The first layered crystalline phase and the second layered crystalline phase may form a composite. For example, in the composite cathode active material, an amount of the second layered crystalline phase may be less than about 40 weight %, based on a total weight of the composite cathode active material. For example, in the composite cathode active material, the amount of the second layered crystalline phase may be less than about 30 weight %, based on a total weight of the composite cathode active material. For example, in the composite cathode active material, the amount of the second layered crystalline phase may be less than about 30 weight %, based on a total weight of the composite cathode active material. For example, in the composite cathode active material, the amount of the second layered crystalline phase may be less than about 20 weight %, based on a total weight of the composite cathode active material. For example, in the composite cathode active material, the amount of the second layered crystalline phase may be less than about 10 weight %, based on a total weight of the composite cathode active material. When the amount of the second layered crystalline phase in the composite cathode active material is less than about 40 weight %, based on a total weight of the composite cathode active material, the composite cathode active material may have further improved structural stability.

In the composite cathode active material, the first metal oxide may include a second layered crystalline phase having a composition represented by Formula 3:

$$Li_2MnO_3. \qquad \text{Formula 3}$$

That is, $Li_2MnO_3$ may have a layered structure belonging to the space group of C2/m.

In the composite cathode active material, an amount of the second layered crystalline phase may be greater than or equal to about 3 weight %, based on a total weight of the composite cathode active material. For example, in the composite cathode active material, the amount of the second layered crystalline phase may be in a range of about 3 weight % to about 10 weight %, based on a total weight of the composite cathode active material. For example, in the composite cathode active material, the amount of the second layered crystalline phase may be in a range of about 10 weight % to about 40 weight %, based on a total weight of the composite cathode active material. For example, in the composite cathode active material, the amount of the second layered crystalline phase may be in a range of about 10 weight % to about 30 weight %, based on a total weight of the composite cathode active material.

In the composite cathode active material, the first metal oxide may include a first layered crystalline phase having a composition represented by Formula 4:

LiNi$_e$Mn$_f$Co$_g$O$_2$,  Formula 4 wherein, in Formula 4, e, f, and g may each satisfy $0<e\leq1$, $0<f\leq0.3$, and $0<g\leq0.2$.

In the composite cathode active material, the second metal oxide may be represented by Formula 5:

Li$_x$M'$_y$O$_z$  Formula 5

In Formula 5, $0\leq x\leq3$, $1\leq y\leq3$, and $2\leq z\leq8$,
M' may include at least one selected from manganese (Mn), vanadium (V), chromium (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt).

For example, the second metal oxide may include at least one selected from Li$_3$VO$_8$, V$_2$O$_5$, LiV$_3$O$_8$, LiMn$_2$O$_4$, Li$_2$MnO$_3$, LiNi$_{0.5}$Mn$_{1.5}$O$_4$, LiCo$_{1-x}$Ma$_x$O$_2$ (where $0\leq x<1$ and Ma is a transition metal), LiNi$_{1-x}$Ma$_x$O$_2$ (where $0\leq x<1$ and Ma is a transition metal), and LiMn$_{1-x}$Ma$_x$O$_2$ (where $0\leq x<1$ and Ma is a transition metal).

According to an embodiment of the present disclosure, a cathode may include the composite cathode active material.

For example, the composite cathode active material, a conducting agent, a binder, and a solvent may be mixed together to prepare a cathode active material composition. The cathode active material composition may be directly coated on an aluminum current collector, and then dried to prepare a cathode plate on which a cathode active material layer is formed. In various embodiments, the cathode active material composition may be cast on a separate support to form a film, which may then be separated from the support and laminated on an aluminum current collector to form a cathode plate on which a cathode active material layer is formed.

The conducting agent may be at least one selected from carbon black, graphite particle, natural graphite, artificial graphite, acetylene black, Ketjen black; carbon fiber; carbon nanotube; metal powder or metal fiber or metal tube of copper, nickel, aluminum, or silver; and a conducting polymer such as a polyphenylene derivative, but the conducting agent is not limited thereto. Any suitable material available as a conducting agent, including those used in the art, may be used.

The binder may be at least one selected from a vinylidene fluoride/hexafluoropropylene copolymer, polyvinylidene fluoride, polyacrylonitrile, polymethyl methacrylate, polytetrafluoroethylene (PTFE), and a styrene butadiene rubber polymer, but the binder is not limited thereto. The solvent may be at least one selected from N-methyl-pyrrolidone (NMP), acetone, and water, but the solvent is not limited thereto. Any suitable material available as a binder and any suitable material available as a solvent may be used.

In various embodiments, pores may be formed in an electrode plate by further including a plasticizing agent in the cathode active material composition.

Amounts of the composite cathode active material, the conducting agent, the binder, and the solvent can be determined by one of skill in the art without undue experimentation. At least one of the conducting agent, the binder, and the solvent may be omitted according to the use and the structure of the lithium battery.

In addition, the cathode may further include an additional composite cathode active material.

The additional cathode active material may include a lithium-containing metal oxide, and may be any suitable material available in the art. For example, the cathode active material may include a composite oxide of lithium with at least one metal selected from Co, Mg, and Ni. For example, the cathode active material may be at least one compound represented by the following formulae: Li$_a$A$_{1-b}$B'$_b$D$_2$ (where $0.90\leq a\leq1$ and $0\leq b\leq0.5$); Li$_a$E$_{1-b}$B'$_b$O$_{2-c}$D$_c$ (where $0.90\leq a\leq1$, $0\leq b\leq0.5$, and $0\leq c\leq0.05$); LiE$_{2-b}$B'$_b$O$_{4-c}$D$_c$ (where $0\leq b\leq0.5$ and $0\leq c\leq0.05$); Li$_a$Ni$_{1-b-c}$Co$_b$B'$_c$D$_\alpha$ (where $0.90\leq a\leq1$, $0\leq b\leq0.5$, $0\leq c\leq0.05$, and $0<\alpha\leq2$); Li$_a$Ni$_{1-b-c}$Co$_b$B'$_c$O$_{2-\alpha}$F'$_2$, (where $0.90\leq a\leq1$, $0\leq b\leq0.5$, $0\leq c\leq0.05$, and $0<\alpha<2$); Li$_a$Ni$_{1-b-c}$Co$_b$B'$_c$O$_{2-\alpha}$F'$_2$ (where $0.90\leq a\leq1$, $0\leq c\leq0.05$, and $0<\alpha<2$); Li$_a$Ni$_{1-b-c}$Mn$_b$B'$_c$D$_\alpha$ (where $0.90\leq a\leq1$, $0\leq b\leq0.5$, $0\leq c\leq0.05$, and $0<\alpha\leq2$); Li$_a$Ni$_{1-b-c}$Mn$_b$B'$_c$O$_{2-\alpha}$F'$_2$ (where $0.90\leq a\leq1$, $0\leq b\leq0.5$, $0\leq c\leq0.05$, and $0<\alpha<2$); Li$_a$Ni$_{1-b-c}$Mn$_b$B'$_c$O$_{2-\alpha}$F'$_2$ (where $0.90\leq a\leq1$, $0\leq b\leq0.5$, $0\leq c\leq0.05$, and $0<\alpha<2$); Li$_a$Ni$_b$E$_c$G$_d$O$_2$ (where $0.90\leq a\leq1$, $0\leq b\leq0.9$, $0\leq c\leq0.5$, and $0.001\leq d\leq0.1$); Li$_a$Ni$_b$Co$_c$Mn$_d$GeO$_2$ (where $0.90\leq a\leq1$, $0\leq b\leq0.9$, $0\leq c\leq0.5$, $0\leq d\leq0.5$, and $0.001\leq e\leq0.1$); Li$_a$NiG$_b$O$_2$ (where $0.90\leq a\leq1$ and $0.001\leq b\leq0.1$); Li$_a$CoG$_b$O$_2$ (where $0.90\leq a\leq1$ and $0.001\leq b\leq0.1$); Li$_a$MnG$_b$O$_2$ (where $0.90\leq a\leq1$ and $0.001\leq b\leq0.1$); Li$_a$Mn$_2$G$_b$O$_4$ (where $0.90\leq a\leq1$ and $0.001\leq b\leq0.1$); QO$_2$; QS$_2$; LiQS$_2$; V$_2$O$_5$; LiV$_2$O$_5$; LiI'O$_2$; LiNiVO$_4$; Li$_{(3-f)}$J$_2$(PO$_4$)$_3$ (where $0\leq f\leq2$); Li$_{(3-f)}$Fe$_2$(PO$_4$)$_3$ (where $0\leq f\leq2$); and LiFePO$_4$.

In the formulae above, A may be at least one selected from Ni, Co, and Mn; B' may be at least one selected from Al, Ni, Co, Mn, Cr, Fe, Mg, strontium (Sr), V, and a rare earth element; D may be at least one selected from O, F, S, and P; E may be at least one selected from Co and Mn; F' may be at least one selected from fluorine (F), sulfur (S), and phosphorus (P); G may be at least one selected from Al, Cr, Mn, Fe, Mg, lanthanum (La), cerium (Ce), Sr, and V; Q may be at least one selected from titanium (Ti), Mo, and Mn; I' may be at least one selected from Cr, V, Fe, scandium (Sc), and yttrium (Y); and J may be at least one selected from V, Cr, Mn, Co, Ni, and copper (Cu).

The additional cathode material may have a coating layer on a surface thereof. As the additional cathode active material, a compound having a coating layer on a surface of the cathode active material or a mixture of a compound selected from the compounds listed above and a compound including a coating layer may be used. The coating layer may include at least one compound of a coating element selected from an oxide, a hydroxide, an oxyhydroxide, an oxycarbonate, and a hydroxycarbonate of the coating element. The compounds for forming the coating layer may be amorphous or crystalline. The coating element for the coating layer may be at least one selected from Mg, Al, Co, potassium (K), sodium (Na), calcium (Ca), silicon (Si), Ti, V, Sn, Ge, gallium (Ga), B, arsenic (As), and Zr. The coating layer may be formed using any method that does not adversely affect the physical properties of the cathode active material when a compound of the coating element is used, for example, a spray coating method or a dipping method. The coating methods may be well understood by one of ordinary skill in the art, and thus a detailed description thereof will be omitted.

According to an embodiment of the present disclosure, a lithium battery may include the cathode including the composite cathode active material. The lithium battery may be prepared in the following manner.

First, a cathode is prepared according to the method of preparing the cathode.

Next, an anode is prepared. The anode may be prepared in the same manner as in preparing the cathode, except that an anode active material is used instead of the composite cathode active material. In addition, in preparing an anode active material composition, the same conducting agent, binder, and solvent as those used in the preparation of the cathode may be used.

For example, an anode active material, a conducting agent, a binder, and a solvent may be mixed together to prepare an anode active material composition. The anode active material composition may be directly coated on a copper current collector, and then dried to prepare an anode plate. In various embodiments, the anode active material composition may be cast on a separate support to form a film, which may then be separated from the support and laminated on a copper current collector to prepare an anode plate.

In addition, the anode active material may be any anode active material that is suitable for use as an anode active material for a lithium battery available. For example, the anode active material may be at least one selected from a lithium metal, a metal that is alloyable with lithium, a transition metal oxide, a non-transition metal oxide, and a carbonaceous material.

Examples of the metal alloyable with lithium are at least one selected from Si, Sn, Al, Ge, lead (Pb), bismuth (Bi), antimony (Sb), a Si—Y' alloy (where Y' is an alkali metal, an alkaline earth metal, a Group 13 element, a Group 14 element, a transition metal, a rare earth element, or a combined element thereof, and is not Si), and a Sn—Y' alloy (where Y' is an alkali metal, an alkaline earth metal, a Group 13 element, a Group 14 element, a transition metal, a rare earth element, or a combined element thereof, and is not Sn). Y may be Mg, Ca, Sr, barium (Ba), radium (Ra), Sc, Y, Ti, Zr, hafnium (Hf), rutherfordium (Rf), V, Nb, tantalum (Ta), dubnium (Db), Cr, Mo, tungsten (W), seaborgium (Sg), technetium (Tc), Re, bohrium (Bh), Fe, Pb, Ru, osmium (Os), hassium (Hs), rhodium (Rh), iridium (Ir), palladium (Pd), Pt, Cu, silver (Ag), gold (Au), Zn, cadmium (Cd), B, Al, Ga, Sn, indium (In), Ti, Ge, P, As, Sb, Bi, S, selenium (Se), tellurium (Te), and polonium (Po).

Examples of the transition metal oxide include at least one selected from a lithium titanium oxide, a vanadium oxide, and a lithium vanadium oxide.

Examples of the non-transition metal oxide include at least one selected from $SnO_2$ and $SiO_x$ (where $0<x<2$).

Examples of the carbonaceous material include at least one selected from crystalline carbon and amorphous carbon. Examples of the crystalline carbon include graphite, such as natural graphite or artificial graphite that are in shapeless, plate, flake, spherical, or fibrous form. Examples of the amorphous carbon include soft carbon (carbon sintered at low temperatures), hard carbon, meso-phase pitch carbides, and sintered cokes.

Amounts of the anode active material, the conducting agent, the binder, and the solvent may be determined by one of skill in the art without undue experimentation.

Next, a separator is prepared. The separator is disposed between the cathode and the anode and may be any of various separators that are suitable for use in lithium batteries. The separator may have a low resistance to migration of electrolyte ions and an excellent electrolytic solution-retaining ability. For example, the separator may include at least one material selected from glass fiber, polyester, Teflon, polyethylene, polypropylene, and PTFE, each of which may be a non-woven or a woven fabric. For example, a rollable separator including polyethylene or polypropylene may be used for a lithium ion battery. A separator having a good organic electrolytic solution-retaining ability may be used for a lithium ion polymer battery.

To form the separator, a polymer resin, a filler, and a solvent may be mixed together to prepare a separator composition. Then, the separator composition may be directly coated on an electrode and dried to prepare the separator. In various embodiments, the separator composition may be cast on a separate support and then dried to form a film, which may then be separated from the support and laminated on an electrode to prepare the separator.

The polymer resin used to prepare the separator is not particularly limited, and may be any material that is suitable for use as a binder for electrode plates. For example, the polymer resin may be at least one selected from a vinylidenefluoride/hexafluoropropylene copolymer, polyvinylidene fluoride (PVDF), polyacrylonitrile, and polymethylmethacrylate.

Then, an electrolyte is prepared.

For example, the electrolyte may be an organic electrolyte solution. In various embodiments, the electrolyte may be boronic oxide or lithium oxynitride, but is not limited thereto. Any material suitable for use as a solid electrolyte in the art may be used. The solid electrolyte may be formed on the anode by, for example, a sputtering method.

For example, the organic electrolyte solution may be prepared by dissolving a lithium salt in an organic solvent.

The organic solvent may be any suitable solvent available as an organic solvent in the art. For example, the organic solvent may be at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N, N-dimethyl formamide, dimethyl acetamide, dimethylsulfoxide, dioxane, 1,2-dimethoxyethane, sulfolane, dichloroethane, chlorobenzene, nitrobenzene, diethylene glycol, and dimethyl ether.

The lithium salt may be any material available as a lithium salt in the art. For example, the lithium salt may be at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), LiCl, and LiI.

Figure 8:
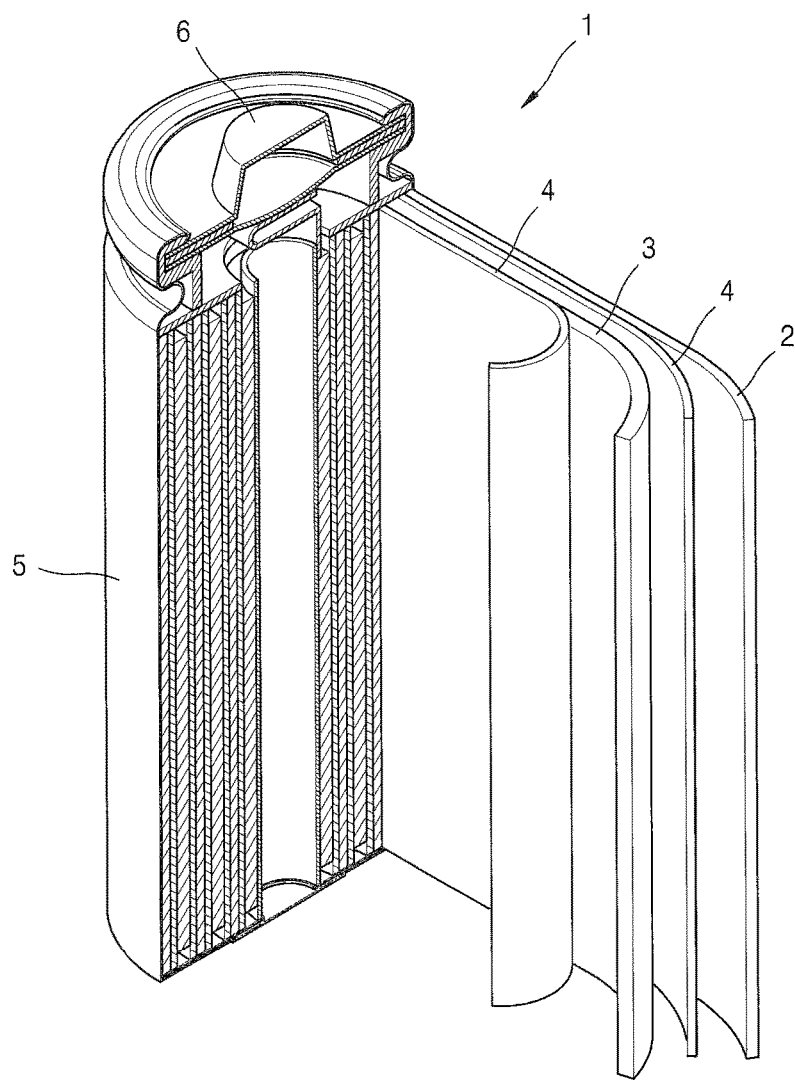
FIG. 8 is a schematic diagram of a lithium battery according to an embodiment.

Referring to FIG. 8, a lithium battery 1 includes a cathode 3, an anode 2, and a separator 4. The cathode 3, the anode 2, and the separator 4 may be wound or folded, and then sealed in a battery case 5. Then, the battery case 5 may be filled with an organic electrolytic solution and sealed with a cap assembly 6, thereby completing the manufacture of the lithium battery 1. The battery case 5 may be a cylindrical type, a rectangular type, or a thin-film type. For example, the lithium battery 1 may be a large-scale thin-film type battery. The lithium battery 1 may be a lithium ion battery.

The separator 4 may be disposed between the cathode 3 and the anode 2 to form a battery assembly. The battery assembly may be stacked in a bi-cell structure and impregnated with the electrolytic solution. The resultant assembly may be put into a pouch and sealed, thereby completing the manufacture of a lithium ion polymer battery.

In addition, a plurality of battery assemblies may be stacked to form a battery pack, which may be used in any device in which high capacity and high output would be beneficial, for example, in a laptop computer, a smart phone, or an electric vehicle.

In addition, the lithium battery 1 may have improved lifetime characteristics and high rate characteristics, and thus may be used in an electric vehicle (EV), for example, in a hybrid vehicle such as a plug-in hybrid electric vehicle (PHEV). In addition, the lithium battery 1 may be applicable to the high-power storage field. For example, the lithium battery 1 may be used in an electric bicycle or a power tool.

According to an embodiment of the present disclosure, a method of preparing a composite cathode active material may include: providing a first metal oxide including a plurality of layered crystalline phases comprising a first layered crystalline phase and a second layered crystalline phase, wherein the first and second layered crystalline phases have different compositions than each other; combining the first metal oxide and a precursor of a second metal oxide to form a mixture, the second metal oxide being represented by Formula 1; drying the mixture; and heat-treating the dried mixture to form the composite cathode active material:

Li$_x$M$_y$O$_z$                Formula 1 wherein, in Formula 1, 0≤x≤3, 1≤y≤3, and 2≤x≤8, and M may be at least one selected from a Group 4 element to a Group 13 element.

In the method of preparing the composite cathode active material, the first metal oxide including a plurality of layered crystalline phases having different compositions in each layer may be prepared by a method commonly used in the art. For example, a precursor of the first metal oxide, the precursor including a plurality of transition metals, is mixed with excessive lithium to form a mixture. The mixture is then heat-treated to form a first metal oxide. The first metal oxide may include a Mn-rich phase, or may be a lithium transition metal oxide with an excessive amount of lithium. In the first metal oxide, a portion of a transition metal may be substituted with lithium.

In the method of preparing the composite cathode active material, the precursor of the second metal oxide may be a non-lithium source. That is, the precursor of the second metal oxide may be a compound not including lithium. Any compound including a metal capable of forming a second metal oxide, excluding lithium, may be used as the precursor of the second metal oxide. For example, the precursor of the second metal oxide may be any compound including the metal M of Formula 1. For example, the precursor of the second metal oxide may be a coordination compound including M of Formula 1. For example, the precursor of the second metal oxide may be at least one selected from manganese (II) acetate tetrahydrate (Mn(CH$_3$COO)$_2$·4H$_2$O), cobalt II acetate tetrahydrate (Co(CH$_3$COO)$_2$·4H$_2$O), and NH$_4$VO$_3$, but is not limited thereto. Any material suitable for use as the precursor of the second metal oxide may be used.

In the method of preparing the composite cathode active material, the mixing of the first metal oxide with the precursor of the second metal oxide may be performed by a wet process or a dry process. According to the wet process, the first metal oxide and the precursor of the second metal oxide may be mixed in a solvent, such as alcohol, to prepare an alcohol solution, and then, the solvent may be evaporated therefrom, to form a dried mixture. According to the dry process, the first metal oxide and the precursor of the second metal oxide may be mechanically mixed in a powder state, thereby preparing a mixture.

In the method of preparing the composite cathode active material, the drying or heat-treating of the mixture may be performed in an oxygen atmosphere at a temperature in a range of about 200° C. to about 800° C., or a range of about 250° C. to about 750° C., or a range of about 300° C. to about 720° C., for about 2 to 40 hours. Conditions for drying or heat-treating of the mixture are not limited thereto, but in consideration of types of metals to be used, the conditions may be appropriated adjusted within the ranges provided above to further improve the properties of a battery.

In the method of preparing the composite cathode active material, an amount of the precursor of the second metal oxide to be mixed with the first metal oxide may be in a range of about 0.01 weight % to about 10 weight %, based on the total weight of the mixture. For example, in the method of preparing the composite cathode active material, the amount of the precursor of the second metal oxide to be mixed with the first metal oxide may be in a range of about 0.1 weight % to about 10 weight % based on the total weight of the mixture. For example, in the method of preparing the composite cathode active material, the amount of the precursor of the second metal oxide to be mixed with the first metal oxide may be in a range of about 0.1 weight % to about 5 weight % based on the total weight of the mixture. For example, in the method of preparing the composite cathode active material, the amount of the precursor of the second metal oxide to be mixed with the first metal oxide may be in a range of about 0.1 weight % to about 2 weight % based on the total weight of the mixture. For example, in the method of preparing the composite cathode active material, the amount of the precursor of the second metal oxide to be mixed with the first metal oxide may be in a range of about 0.1 weight % to about 1 weight % based on the total weight of the mixture. For example, in the method of preparing the composite cathode active material, the amount of the precursor of the second metal oxide to be mixed with the first metal oxide may be in a range of about 0.2 weight % to about 1 weight % based on the total weight of the mixture. For example, in the method of preparing the composite cathode active material, the amount of the precursor of the second metal oxide to be mixed with the first metal oxide may be in a range of about 0.2 weight % to about 0.9 weight % based on the total weight of the mixture. When the composite cathode active material includes the precursor of the second metal oxide in an amount within the ranges provided above, the composite cathode active material having improved properties may be prepared.

One or more embodiments will now be described in more detail with reference to the following examples. However, these examples are not intended to limit the scope of the one or more embodiments.

EXAMPLES (Preparation of Composite Cathode Active Material 1)

Examples 1 to 13

Lithium acetate dehydrate (CH$_3$COOLi·2H$_2$O) and a Ni$_{0.8}$Co$_{0.1}$Mn$_{0.1}$(OH)$_2$ precursor were mixed together at a molar ratio of 1.03:1.00 to obtain a mixture. The mixture was then subjected to a first heat treatment, thereby preparing a first metal oxide, Li$_{1.015}$(Ni$_{0.8}$Co$_{0.1}$Mn$_{0.1}$)$_{0.985}$O$_2$.

After obtaining the mixture of the first metal oxide and the precursor of the second metal oxide, oxygen flowing at a flow rate of about 20 ml/min was supplied to the mixture while the mixture was subjected to a second heat treatment, thereby preparing the composite cathode active materials of Examples 1 to 13.

The first heat treatment was performed according to a first mode or a second mode. According to the first mode, for the first heat treatment, a cycle of slowly increasing a tempera ture to 750° C. at a rate of 2.0° C./minute, maintaining the temperature at 750° C. for 12 hours, and cooling the temperature from 750° C. to room temperature at a rate of −2.0° C./minute was performed. According to the second mode, for the first heat treatment, a cycle of increasing a temperature to 800° C. at a rate of 1.0° C./minute, maintaining the temperature at 800° C. for 5 hours, decreasing the temperature from 800° C. to 750° C. at a rate of −1.0° C./minute, maintaining the temperature at 750° C. for 10 hours, and cooling the temperature from 750° C. to room temperature at a rate of −1.0° C./minute was performed.

The obtaining of the mixture of the first metal oxide and the precursor of the second metal oxide may be performed by a wet process or a dry process. According to the wet process, the first metal oxide and the precursor of the second metal oxide may be mixed in a solvent, such as ethanol, to prepare a mixed solution, and then, the mixed solution is subjected to volatilization at a temperature of 85° C., thereby obtaining a mixture from which ethanol was evaporated. According to the dry process, the first metal oxide and the precursor of the second metal oxide may be mechanically mixed in a powder state, thereby preparing a mixture. In each of the Examples, manganese II acetate tetrahydrate $(Mn(CH_3COO)_2 \cdot 4H_2O)$, cobalt II acetate tetrahydrate $(Co(CH_3COO)_2 \cdot 4H_2O)$, or $NH_4VO_3$ was used as the precursor of the second metal oxide. Detailed conditions for preparing the composite cathode active materials of Examples 1 to 13 are shown in Table 1. In Table 1, an input amount of the precursor of the second metal oxide refers to an input amount of the precursor of the second metal oxide based on the total weight of the first metal oxide and the precursor of the second metal oxide.

Comparative Examples 1 to 6

Composite cathode active materials were prepared using the same first metal oxide as that of Example 1 (Comparative Example 1), the first metal oxide of Example 1 washed with water (Comparative Example 2), the first metal oxide of Example 1 washed with ethanol (Comparative Example 3), or the first metal oxide of Example 1 mixed with lithium acetate dehydrate $(CH_3COOLi \cdot 2H_2O)$, serving as a lithium source and underwent the second heat treatment (Comparative Examples 4 to 6).

Detailed conditions for preparing the composite cathode active materials of Comparative Examples 1 to 6 are shown in Table 1.

TABLE 1

|  | 1st heat treatment | 2nd metal oxide precursor | 2nd metal oxide precursor [wt %] | Process | 2nd heat treatment | 2nd metal oxide | Residual Li [ppm] |
| --- | --- | --- | --- | --- | --- | --- | --- |
| Ex 1 | First mode | $Co(CH_3COO)_2 \cdot 4H_2O$ | 0.5 | Wet | 700° C./5 hr | $LiCoO_2$ | 2415 |
| Exe 2 | Second mode | $Co(CH_3COO)_2 \cdot 4H_2O$ | 0.5 | Wet | 700° C./5 hr | $LiCoO_2$ | 2059 |
| Ex 3 | First mode | $Co(CH_3COO)_2 \cdot 4H_2O$ | 0.5 | Dry | 700° C./5 hr | $LiCoO_2$ | 2636 |
| Ex 4 | First mode | $NH_4VO_3$ | 0.25 | Wet | 300° C./5 hr | $LiV_3O_8$ & $V_2O_5$ | 2583 |
| Ex 5 | First mode | $NH_4VO_3$ | 0.5 | Wet | 300° C./5 hr | $LiV_3O_8$ & $V_2O_5$ | 2247 |
| Ex 6 | First mode | $NH_4VO_3$ | 1.0 | Wet | 300° C./5 hr | $LiV_3O_8$ & $V_2O_5$ | 2227 |
| Ex 7 | First mode | $NH_4VO_3$ | 0.5 | Wet | 700° C./5 hr | $LiV_3O_8$ & $V_2O_5$ | 2930 |
| Ex 8 | Second mode | $NH_4VO_3$ | 0.5 | Wet | 700° C./5 hr | $LiV_3O_8$ & $V_2O_5$ | 2505 |
| Ex 9 | Second mode | $NH_4VO_3$ | 0.5 | Dry | 700° C./5 hr | $LiV_3O_8$ & $V_2O_5$ | 2903 |
| Ex 10 | First mode | $Mn(CH_3COO)_2 \cdot 4H_2O$ | 0.5 | Dry | 400° C./32 hr | $Li_2MnO_3$ or $LiMnO_2$ | 2655 |
| Ex 11 | First mode | $Mn(CH_3COO)_2 \cdot 4H_2O$ | 0.5 | Wet | 700° C./5 hr | $LiMnO_2$ | 2392 |
| Ex 12 | Second mode | $Mn(CH_3COO)_2 \cdot 4H_2O$ | 0.5 | Wet | 700° C./5 hr | $LiMnO_2$ | 2191 |
| Ex 13 | Second mode | $Mn(CH_3COO)_2 \cdot 4H_2O$ | 0.5 | Dry | 700° C./5 hr | $LiMnO_2$ | 2625 |
| CEx 1 | First mode | — | — | Bare | — | — | 3295 |
| CEx 2 | First mode | — | — | Water-cleaning | — | — | 873 |
| CEx 3 | First mode | — | — | Ethanol-cleaning | — | — | 2942 |
| Ref. Ex 1 | First mode | $Mn(CH_3COO)_2 \cdot 4H_2O$ + $CH_3COOLi \cdot 2H_2O$ | — | Dry | — | $Li_2MnO_3$ or $LiMnO_2$ | 3056 |
| Ref. Ex 2 | First mode | $Mn(CH_3COO)_2 \cdot 4H_2O$ + $CH_3COOLi \cdot 2H_2O$ | — | Dry | — | $LiMnO_2$ | 3203 |
| Ref. Ex 3 | First mode | $Mn(CH_3COO)_2 \cdot 4H_2O$ + $CH_3COOLi \cdot 2H_2O$ | — | Dry | — | $LiMnO_2$ | 3370 |

In Table 1:
Ex refers to Example
CEx refers to Comparative Example
Ref. Ex refers to Reference Example
2nd metal oxide precursor refers to the amount of the second metal oxide precursor in weight percent (wt %).
Process refers to the process for mixing the first metal oxide and the precursor of second metal oxide
Residual Li refers to the amount of residual lithium (amount of lithium in mixture of $LiCO_3$ and LiOH), in parts per million (ppm).

Referring to Table 1, it was confirmed that the amounts of residual lithium in the composite cathode active materials prepared in Examples 1 to 13 was reduced as compared to the amounts of residual lithium in the composite cathode active material prepared in Comparative Example 1 and Reference Examples 1 to 3.

In the composite cathode active materials prepared in Comparative Examples 2 and 3, the amounts of residual free surface lithium were reduced due to the washing process performed thereon. Such washing process may result in a rough surface of the composite cathode active materials, and thus, as shown in Table 2 below, the charge-discharge characteristics of the composite cathode active materials were deteriorated.

For the composite cathode active materials prepared in Reference Examples 1 to 3, a lithium source was provided during the second heat treatment, and consequently, the amounts of residual lithium therein were not substantially reduced as compared to the amount of free lithium in the composite cathode active material prepared in Comparative Example 1. Rather, the amounts of residual lithium in the composite cathode active materials prepared in Reference Examples 1 to 3 increased, compared to the amount of residual lithium in the composite cathode active material prepared in Comparative Example 1.

Preparation of Lithium Battery (Half-Cell Type) 1
Preparation of Cathode

Comparative Example 1-1

A mixture, in which the composite cathode active material prepared in Comparative Example 1, a carbon conducting agent (Denka Black), and polyvinylidene fluoride (PVdF) were mixed at a weight ratio of 92:4:4, was mixed with N-methylpyrrolidone (NMP), thereby preparing slurry. The slurry was coated on an aluminum current collector having a thickness of 15 μm by bar-coating, dried at room temperature, and additionally dried in vacuum at a temperature of 120° C., thereby preparing a cathode plate having a thickness of 45 μm by roll-pressing and punching the aluminum current collector.
(Preparation of Coin Cell)

A coin cell was prepared by using the cathode plate, lithium metal as a counter electrode, a PTFE separator, and an electrolyte prepared by dissolving 1.3 molar (M) $LiPF_6$ in a solvent mixture of ethylene carbonate (EC), diethyl carbonate (DEC), and ethyl methyl carbonate (EMC) at a volume ratio of EC/DEC/EMC=3:4:3.

Comparative Examples 2-1 and 3-1

Coin cells were prepared in the same manner as in Comparative Example 1-1, except that the composite cathode active materials prepared in Comparative Examples 2 and 3 were used, respectively, instead of the composite cathode active material prepared in Comparative Example 1.

Evaluation Example 1: Charge-Discharge Characteristics Evaluation

The coin cells prepared in Comparative Examples 1-1, 2-1, and 3-1 were each charged with a constant current at a rate of 0.1 C at a temperature of 25° C. until a voltage reached 4.35 volts (V) (vs. Li), and subsequently cut-off with a current at a rate of 0.05 C while the voltage was maintained at 4.35 V in a constant voltage mode. Then, the coin cells were each discharged with a constant current at a rate of 0.1 C until a voltage reached 2.8 V (vs. Li) ($1^{st}$ cycle).

The coin cells that underwent the $1^{st}$ cycle were each charged with a constant current at a rate of 0.33 C at a temperature of 25° C. until a voltage reached 4.35 V (vs. Li), and subsequently cut-off with a current at a rate of 0.05 C while the voltage was maintained at 4.35 V in a constant voltage mode. Then, the coin cells were each discharged with a constant current at a rate of 0.2 C until a voltage reached 2.8 V (vs. Li) ($2^{nd}$ cycle).

The coin cells that underwent the $2^{nd}$ cycle were charged with a constant current at a rate of 1.0 C at a temperature of 25° C. until a voltage reached 4.35 V (vs. Li), and subsequently cut-off with a current at a rate of 0.05 C while the voltage was maintained at 4.35 V in a constant voltage mode. Then, the coin cells were each discharged with a constant current at a rate of 1.0 C until a voltage reached 2.8 V (vs. Li). The charge-discharge cycle was repeated up to the $50^{th}$ cycle.

Throughout all the charge-discharge cycles, a rest time of 10 minutes was provided in between each charge-discharge cycle.

The results of the charge-discharge test are shown in Table 2. The capacity retention of the coin cells at the $50^{th}$ cycle is defined as shown in Equation 1.

Capacity retention rate at $50^{th}$ cycle [%]=[Discharge capacity at $50^{th}$ cycle/Discharge capacity at $1^{st}$ cycle]×100%   Equation 1

TABLE 2

|  | Capacity retention rate at $50^{th}$ cycle [%] |
|---|---|
| Comparative Example 1-1 | 94 |
| Comparative Example 2-1 | 92 |
| Comparative Example 3-1 | 73 |

Referring to Table 2, it was confirmed that the lifespan characteristics of the coin cells prepared in Comparative Examples 2-1 and 3-1, including the composite cathode active materials that underwent the washing process, was deteriorated compared to those of the coin cells prepared in Comparative Example 1 including the composite cathode active material that did not undergo the washing process.

Therefore, it was confirmed that the amounts of free surface lithium in the composite cathode active materials may be decreased by performing the washing process, but in this case, the surface of the composite cathode active materials may become rough enough so that the number of side reactions with an electrolyte increases, thereby resulting in deterioration of the charge-discharge characteristics of the coin cells.
Preparation of Composite Cathode Active Material 2

Examples 14 to 17

Composite cathode active materials were prepared in the same manner as in the Preparation of composite cathode active material 1. Detailed conditions for preparing the composite cathode active materials are shown in Table 3. Here, an input of the precursor of the second metal oxide refers to an input of the precursor of the second metal oxide based on the total moles of transition metals in the first metal oxide. Detailed conditions for preparing the composite cathode active materials are shown in Table 3.

Comparative Example 4

The first metal oxide prepared in Example 1 was used as a composite cathode active material.

TABLE 3

|  | 1st heat treatment | 2nd metal oxide precursor | Amount of $2^{nd}$ metal oxide precursor [wt %] | Process | 2nd heat treatment | 2nd metal oxide | Residual Li [ppm] |
|---|---|---|---|---|---|---|---|
| Ex 14 | First mode | $Co(CH_3COO)_2 \cdot 4H_2O$ | 0.25 | Wet | 720° C./5 hr | $LiCoO_2$ | 2051 |
| Ex 15 | First mode | $Co(CH_3COO)_2 \cdot 4H_2O$ | 0.50 | Wet | 720° C./5 hr | $LiCoO_2$ | 1843 |
| Ex 16 | First mode | $Co(CH_3COO)_2 \cdot 4H_2O$ | 0.75 | Wet | 720° C./5 hr | $LiCoO_2$ | 1679 |

TABLE 3-continued

|  | 1st heat treatment | 2nd metal oxide precursor | Amount of $2^{nd}$ metal oxide precursor [wt %] | Process | 2nd heat treatment | 2nd metal oxide | Residual Li [ppm] |
|---|---|---|---|---|---|---|---|
| Ex 17 | First mode | Co(CH$_3$COO)$_2$•4H$_2$O | 1.00 | Wet | 720° C./5 hr | LiCoO$_2$ | — |
| CEx 4 | First mode | — | — | Bare | — | — | 3295 |

In Table 3,
  Ex refers to Example
  CEx refers to Comparative Example
  Process refers to the process for mixing the first metal oxide and the precursor of the second metal oxide.
  Residual Li refers to Amount of residual lithium (amount of lithium in mixture of LiCO$_3$ and LiOH).
  Referring to Table 3, it was confirmed that the amounts of residual lithium in the composite cathode active materials prepared in Examples 14 to 16 was reduced as compared to amounts of residual lithium in the composite cathode active material prepared in Comparative Example 4.

Preparation of Lithium Battery (Half-Cell Type) 2
Preparation of Cathode

Examples 14-1 to 17-1

A mixture, in which the composite cathode active materials prepared in Examples 14 to 17, a carbon conducting agent (Denka Black), and PVdF were mixed at a weight ratio of 92:4:4, was mixed with NMP in an agate mortar, thereby preparing slurry. The slurry was coated on an aluminum current collector having a thickness of 15 μm by bar-coating, dried at room temperature, and additionally dried in vacuum at a temperature of 120° C., thereby preparing a cathode plate having a thickness of 45 μm by roll-pressing and punching the aluminum current collector. Here, the packing density of the composite cathode active materials are shown in Table 4, and a loading level of the composite cathode active materials was about 10.0 milligrams per square centimeter (mg/cm$^2$).

Preparation of Coin Cell

Coin cells were each prepared using the cathode plate, lithium metal as a counter electrode, a PTFE separator, and an electrolyte prepared by dissolving 1.3M LiPF$_6$ in EC, DEC, and EMC in a volume ratio of EC:DEC:EMC=3:4:3.

However, gelation of the cathode active material occurred in the preparation of the coin cell of Example 17-1, and so the composite cathode active material was not available for the preparation of the cathode plate and the coin cell.

Comparative Example 4-1

A coin cell was prepared in the same manner as in Example 14-1, except that the composite cathode active material prepared in Comparative Example 4 was used instead of the composite cathode active material prepared in Example 14.

Evaluation Example 2: Charge-Discharge Characteristics Evaluation

The coin cells prepared in Examples 14-1 to 16-1 and Comparative Example 4-1 were each charged with a constant current at a rate of 0.1 C at a temperature of 25° C. until a voltage reached 4.35 V (vs. Li), and subsequently cut-off with a current at a rate of 0.05 C while the voltage was maintained at 4.35 V in a constant voltage mode. Then, the coin cells were each discharged with a constant current at a rate of 0.1 C until a voltage reached 2.8 V (vs. Li) ($1^{st}$ cycle).

The coin cells that underwent the $1^{st}$ cycle were each charged with a constant current at a rate of 0.33 C at a temperature of 25° C. until a voltage reached 4.35 V (vs. Li), and subsequently cut-off with a current at a rate of 0.05 C while the voltage was maintained at 4.35 V in a constant voltage mode. Then, the coin cells were each discharged with a constant current at a rate of 0.2 C until a voltage reached 2.8 V (vs. Li) ($2^{nd}$ cycle).

The coin cells that underwent the $2^{nd}$ cycle were charged with a constant current at a rate of 1.0 C at a temperature of 25° C. until a voltage reached 4.35 V (vs. Li), and subsequently cut-off with a current at a rate of 0.05 C while the voltage was maintained at 4.35 V in a constant voltage mode. Then, the coin cells were each discharged with a constant current at a rate of 1.0 C until a voltage reached 2.8 V (vs. Li). Such a charge-discharge cycle was repeated up to the $50^{th}$ cycle.

Throughout all the charge-discharge cycles, a rest time of 10 minutes was provided after each charge-discharge cycle.

The results of the charge-discharge test are shown in Table 4. The capacity retention of the coin cells at the $50^{th}$ cycle and the initial charge-discharge efficiency are defined as shown in Equations 1 and 2, respectively.

Capacity retention rate at $50^{th}$ cycle [%]=[Discharge capacity at $50^{th}$ cycle/Discharge capacity at $1^{st}$ cycle]×100%  Equation 1

Initial charge-discharge efficiency [%]=[Discharge capacity at $1^{st}$ cycle/Charge capacity at $1^{st}$ cycle]×100%  Equation 2

TABLE 4

|  | Initial charge-discharge efficiency [%] | Capacity retention rate at $50^{th}$ cycle [%] | Packing density [g/cc] |
|---|---|---|---|
| Example 14-1 | 93 | 93 | 3.04 |
| Example 15-1 | 93 | 96 | 3.10 |
| Example 16-1 | 94 | 95 | 3.11 |
| Comparative Example 4-1 | 93 | 93 | 2.97 |

Referring to Table 4, it was confirmed that the coin cells prepared in Examples 15-1 and 16-1 including the composite cathode active materials prepared in Examples 15 to 16 showed improved charge-discharge characteristics and packing density as compared to the coin cell prepared in Comparative Example 4-1 including the composite cathode active material not including the second metal oxide of Comparative Example 4. In particular, among the Examples above, the coin cell prepared in Example 16-1 showed relatively excellent charge-discharge characteristics and packing density.

Preparation of Lithium Battery (Full-Cell Type) 3
Preparation of Cathode

Example 16-2

A mixture, in which the composite cathode active material prepared in Example 16, a carbon conducting agent (Denka Black), and PVdF were mixed at a weight ratio of 92:4:4, was mixed with NMP in an agate mortar, thereby preparing slurry. The slurry was coated on an aluminum current collector having a thickness of 15 μm to a thickness of 69 μm by bar-coating, dried at room temperature, and additionally dried in vacuum at a temperature of 120° C., thereby preparing a cathode plate having a thickness of 45 μm by roll-pressing and punching the aluminum current collector. Here, a loading level of the composite cathode active materials was about 25.88 mg/cm$^2$.

Preparation of Anode 97 weight % of graphite particulates (MC20, Mitsubishi Chemical) as an anode active material, 1.5 weight % of BM408 (Daicel) as a conducting agent, and 1.5 weight % of BM400-B (Zeon) as a binder were mixed together, and then, added to a N-methyl-2-pyrrolidone solvent. By using a mechanical stirring apparatus, the materials in the mixture were dispersed for 60 minutes, thereby preparing an anode active material composition. The anode active material composition was spread on a copper current collector having a thickness of about 10 μm to a thickness of about 60 μmusing a doctor blade, dried in an hot-air drier at a temperature of 100° C. for 0.5 hours, and additionally dried in a vacuum at a temperature of 120° C. for 4 hours, thereby preparing an anode plate on which an anode active material layer was formed by roll-pressing the copper current collector.

(Preparation of Lithium Battery)

A full cell was prepared using the cathode plate, the anode plate, a polyethylene separator coated with ceramic and having a thickness of 18 μm, and an electrolyte prepared by dissolving 1.3 M LiPF$_6$ in EC, DEC, and EMC at a volume ratio of EC:DEC:EMC=3:4:3.

Comparative Example 4-2

A full cell was prepared in the same manner as in Example 16-2, except that the composite cathode active material prepared in Comparative Example 4 was used instead of the composite cathode active material prepared in Example 16.

Evaluation Example 3: Charge-Discharge Characteristics Evaluation

The full cells prepared in Example 16-2 and Comparative Example 4-2 were each charged with a constant current at a rate of 0.1 C at a temperature of 25° C. until a voltage reached 4.35 V (vs. Li), and subsequently cut-off with a current at a rate of 0.05 C while the voltage was maintained at 4.35 V in a constant voltage mode. Then, the full cells were each discharged with a constant current at a rate of 0.1 C until a voltage reached 2.8 V (vs. Li) (1$^{st}$ cycle).

The full cells that underwent the 1$^{st}$ cycle were each charged with a constant current at a rate of 0.33 C at a temperature of 25° C. until a voltage reached 4.35 V (vs. Li), and subsequently cut-off with a current at a rate of 0.05 C while the voltage was maintained at 4.35 V in a constant voltage mode. Then, the full cells were each discharged with a constant current at a rate of 0.2 C until a voltage reached 2.8 V (vs. Li) (2$^{nd}$ cycle).

The full cells that underwent the 2$^{nd}$ cycle were charged with a constant current at a rate of 0.5 C at a temperature of 25° C. until a voltage reached 4.35 V (vs. Li), and subsequently cut-off with a current at a rate of 0.05 C while the voltage was maintained at 4.35 V in a constant voltage mode. Then, the full cells were each discharged with a current at a rate of 0.2 C, 0.33 C, 0.5 C, 1.0 C, 3.0 C, and 5.0 C, until a voltage reached 2.8 V (vs. Li) (3$^{rd}$ to 8$^{th}$ cycles).

The full cells that underwent the 8$^{th}$ cycle were charged with a constant current at a rate of 1.0 C at a temperature of 25° C. until a voltage reached 4.35 V (vs. Li), and subsequently cut-off with a current at a rate of 0.05 C while the voltage was maintained at 4.35 V in a constant voltage mode. Then, the coin cells were each discharged with a constant current at a rate of 1.0 C until a voltage reached 2.8 V (vs. Li). Such a charge-discharge cycle was repeated up to the 50$^{th}$ cycle.

Throughout all the charge-discharge cycles, a rest time of 10 minutes was provided after each charge-discharge cycle.

The results of the charge-discharge test are shown in Table 5. The capacity retention and the initial charge-discharge efficiency of the full cells at the 300$^{th}$ cycle are defined as shown in Equation 3.

$$\text{Capacity retention rate at } 300^{th} \text{ cycle [\%]}=[\text{Discharge capacity at } 300^{th} \text{ cycle/Discharge capacity at } 1^{st} \text{ cycle}]\times 100\% \quad \text{Equation 3}$$

TABLE 5

| | Discharge capacity rate [mAh/g] | | | | | | Capacity retention rate at 300$^{th}$ cycle [%] |
|---|---|---|---|---|---|---|---|
| | 0.2 C | 0.33 C | 0.5 C | 1.0 C | 3.0 C | 5.0 C | |
| Comparative Example 4-2 | 204 | 201 | 198 | 193 | 183 | 141 | 88.0 |
| Example 16-2 | 201 | 198 | 195 | 191 | 182 | 161 | 90.5 |

Referring to Table 5, it was confirmed that the full cell prepared in Example 16-2 including the composite cathode active material prepared in Example 16 showed improved high-rate discharge capacity and lifespan characteristics, compared to the full cell prepared in Comparative Example 4-2 including the composite cathode active material not including the second metal oxide of Comparative Example 4.

Evaluation Example 4: High Resolution Transmission Electron Microscopic (HR-TEM) Analysis Images of powders of the composite cathode active material prepared in Example 16 were obtained using a high resolution transmission electron microscope (HR-TEM) in order to analyze a surface and an interior of the composite cathode active material prepared in Example 16. The results are shown in FIGS. 1A to 1C and 2A and 2B.

Figure 1B:
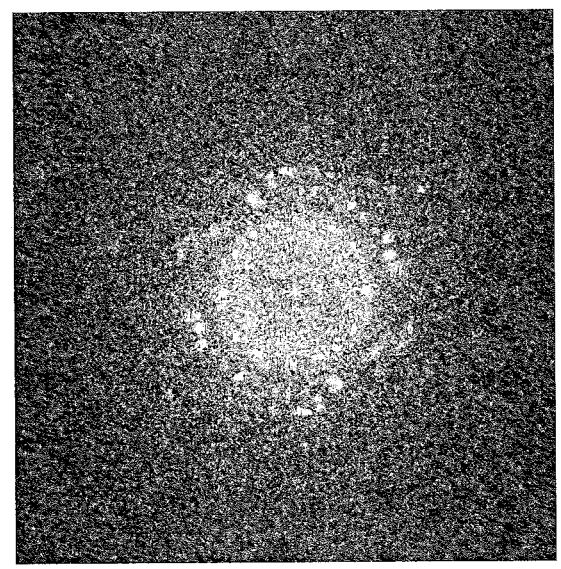
FIG. 1B is a HR-TEM image of an electron diffraction pattern associated with the second metal oxide at the surface of the composite cathode active material shown in FIG. 1A.
Figure 1C:
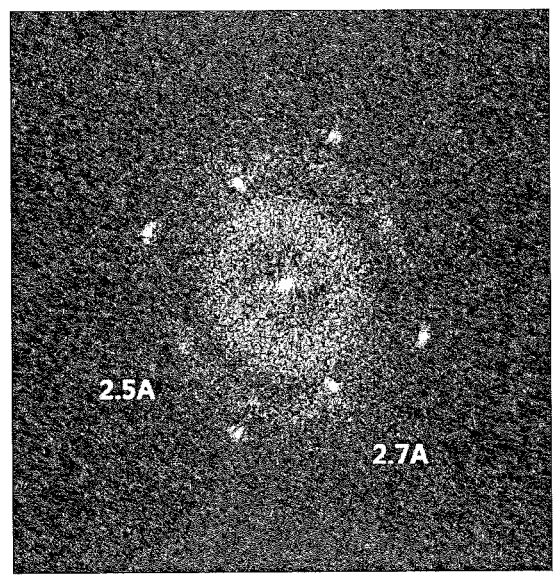
FIG. 1C is a HR-TEM image of an electron diffraction pattern associated with the first metal oxide at the surface of the composite cathode active material shown in FIG. 1A.

FIGS. 1A, 1B, and 1C are an HR-TEM image showing a surface of the composite cathode active material prepared in Example 16.

Referring to FIGS. 1A, 1B, and 1C, it was confirmed that the second metal oxide including a separate composite crystalline phase was disposed on the surface of the composite cathode active material prepared in Example 16.

In FIG. 1A, a dotted line box in the upper right corner is a part where the second metal oxide was disposed. FIG. 1B, shows an electron diffraction pattern associated with the second metal oxide. FIG. 1C shows an electron diffraction pattern associated with the first metal oxide which forms the surface of the composite cathode active material prepared in Example 16. As shown in FIG. 1C, it was confirmed that the first metal oxide has a layered crystalline structure. However, as shown in FIG. 1B, it was confirmed that the second metal oxide, not showing a clear crystalline structure, forms a composite crystalline phase.

In addition, in FIGS. 1A to 1C, it was confirmed that the composite cathode active material prepared in Example 16 includes the first layered crystalline phase which forms the surface of the composite cathode active material, and the first layered crystalline phase belongs to the space group of R-3m and includes the Ni, Co, and Mn. Accordingly, the second metal oxide is disposed on the first layered crystalline phase of the first metal oxide.

Figure 2A:
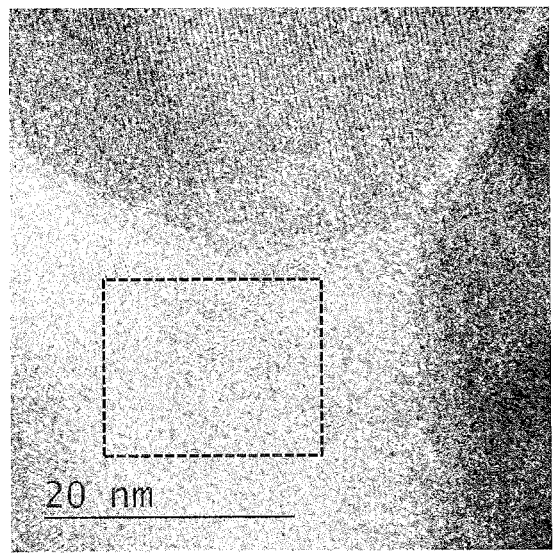
FIG. 2A is an HR-TEM image showing an inner part of a composite cathode active material prepared in Example 16.
Figure 2B:
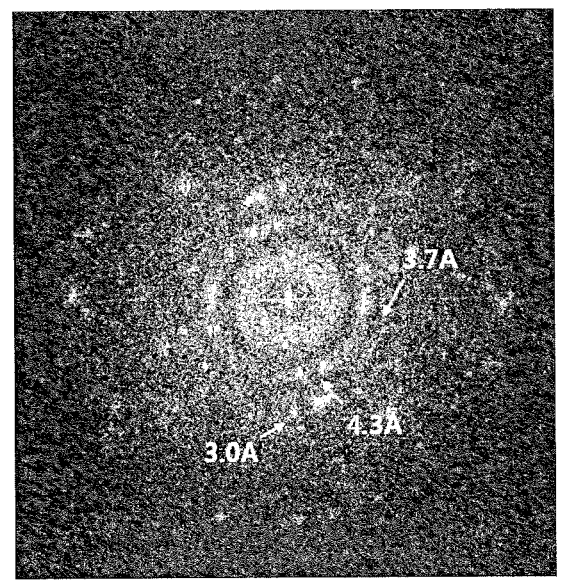
FIG. 2B is an HR-TEM image of an electron diffraction pattern associated with the second metal oxide at an inner part of the composite cathode active material shown in FIG. 2A.

FIGS. 2A and 2B are HR-TEM images showing a cross-section of the composite cathode active material prepared in Example 16. That is, FIGS. 2A and 2B are TEM images of an interior portion of the composite cathode active material prepared in Example 16. Referring to FIG. 2B, it was confirmed that the second metal oxide is disposed between grains of the first metal oxide. That is, it was confirmed that the second metal oxide is disposed at a grain boundary of the first metal oxide.

Therefore, the second metal oxide is homogeneously disposed on the surface of the composite cathode active material prepared in Example 16 and inside the composite cathode active material prepared in Example 16.

Evaluation Example 5: Surface Composition Analysis According to Scanning Electron Microscopy and Using Inductively Coupled Plasma Atomic Emission Spectroscopy (ICP-AES)

Powders of the composite cathode active material prepared in Example 16 and Comparative Example 4 were subjected to analysis using a scanning electron microscope (SEM) and inductively coupled plasma atomic emission spectroscopy (ICP-AES) in order to analyze a surface of the composite cathode active materials prepared in Example 16 and Comparative Example 4. The results are shown in FIGS. 3A, 3B, 4A, and 4B and in Table 6.

TABLE 6

| Unit | mol % | | | |
| --- | --- | --- | --- | --- |
| | Li | Ni | Co | Mn |
| Comparative Example 4 | 1.02 | 0.804 | 0.098 | 0.097 |
| Example 16 | 1.01 | 0.801 | 0.103 | 0.096 |

Referring to Table 6, it was confirmed that the Co amount in the composite cathode active material prepared in Example 16, in which the second metal oxide including Co is disposed on a surface, was greater than that of the composite cathode active material prepared in Comparative Example 4.

Figure 3A:
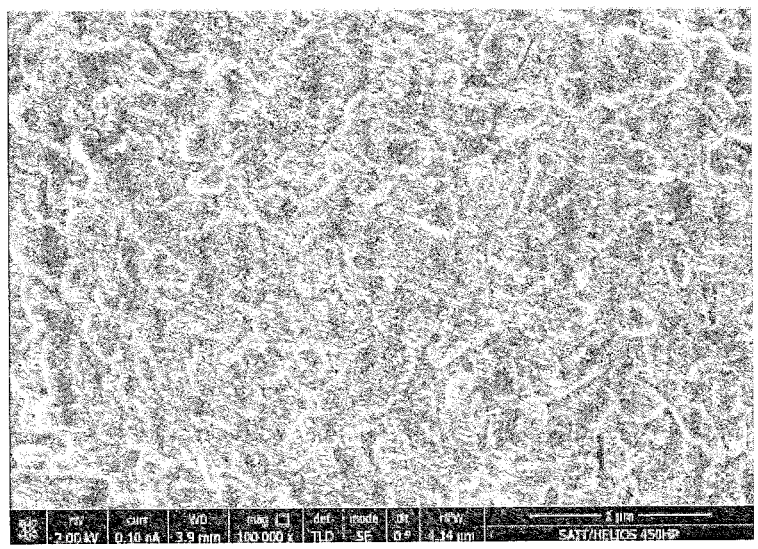
FIG. 3A is a scanning electron microscopic (SEM) image showing a surface of a composite cathode active material prepared in Comparative Example 4.
Figure 3B:
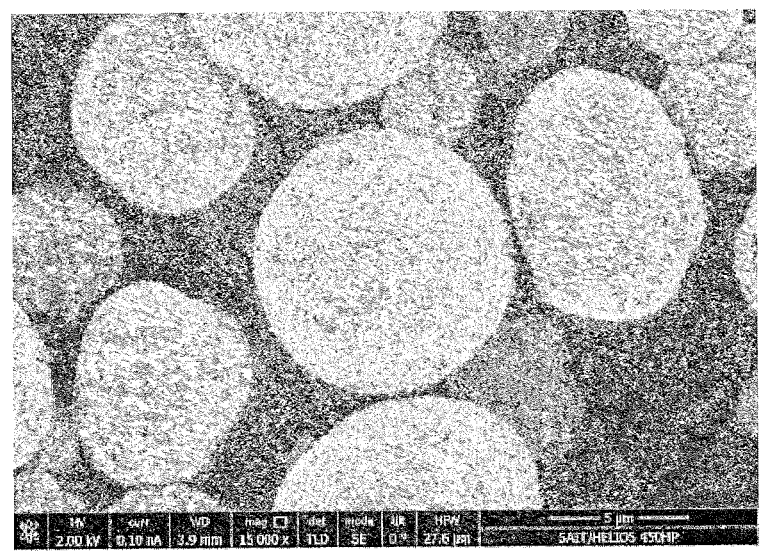
FIG. 3B is a magnified image of a portion of the composite cathode active material in FIG. 3A.
Figure 4A:
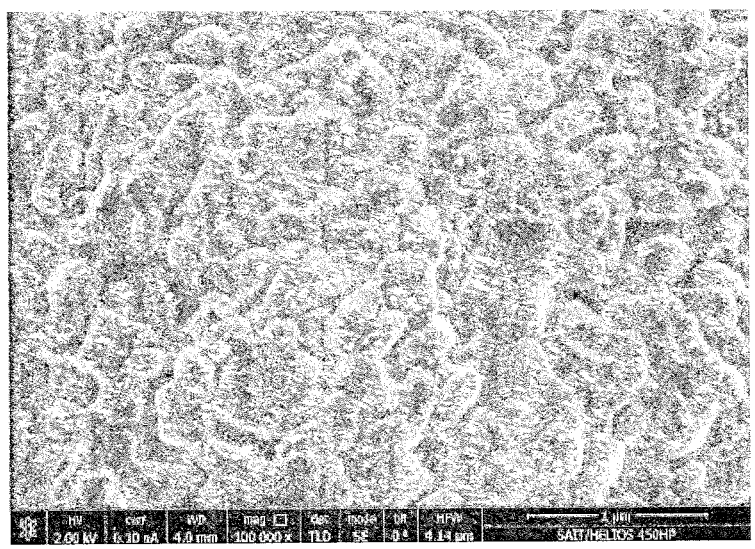
FIG. 4A is an SEM image showing a surface of a composite cathode active material prepared in Example 16.
Figure 4B:
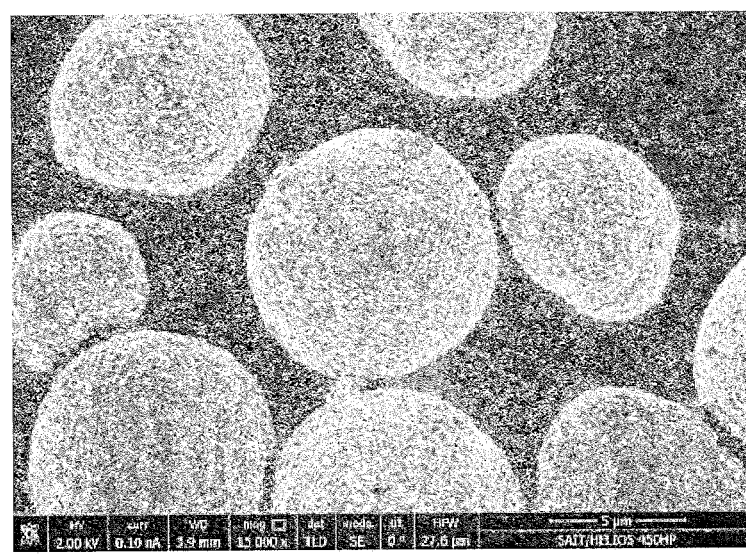
FIG. 4B is a magnified image of a portion of the composite cathode active material in FIG. 4A.

FIG. 3A is a scanning electron microscopic (SEM) image showing a surface of a composite cathode active material prepared in Comparative Example 4, and FIG. 3B is a magnified image of a portion of the composite cathode active material in FIG. 3A. FIG. 4A is an SEM image showing a surface of a composite cathode active material prepared in Example 16, and FIG. 4B is a magnified image of a portion of the composite cathode active material in FIG. 4A. Referring to FIGS. 4A and 4B showing the surface of the composite cathode active material prepared in Example 16, and FIGS. 3A and 3B showing the surface of the composite cathode active material prepared in Comparative Example 4, it was confirmed that more adducts (i.e., the second metal oxide, such as $LiCoO_2$) were disposed on a surface of the composite cathode active material prepared in Example 16.

Evaluation Example 6: Scanning Electron Microscopy

Figure 5:
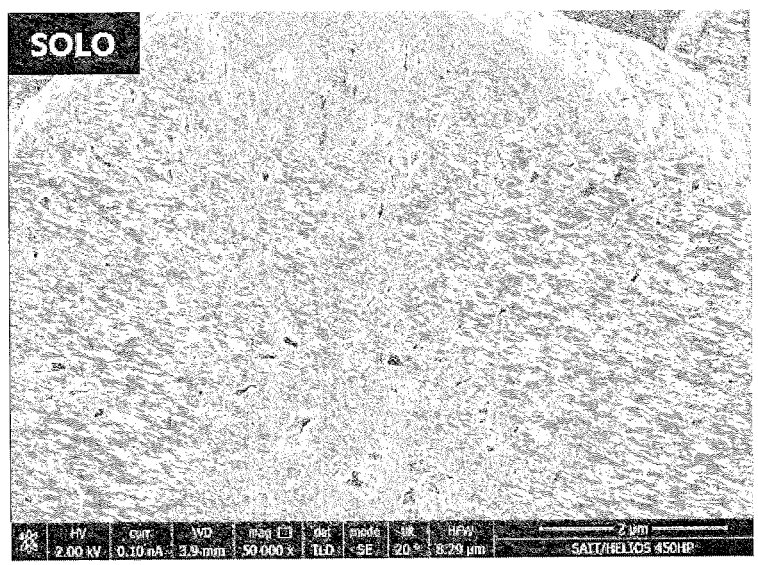
FIG. 5 is an SEM image showing a cross-section of a composite cathode active material prepared in Comparative Example 4.
Figure 6:
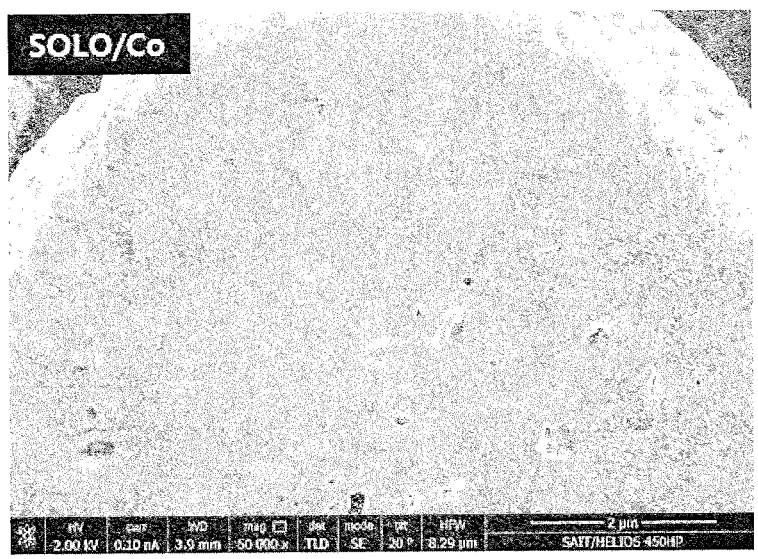
FIG. 6 is an SEM image showing a cross-section of a composite cathode active material prepared in Example 16.
Figure 7A:
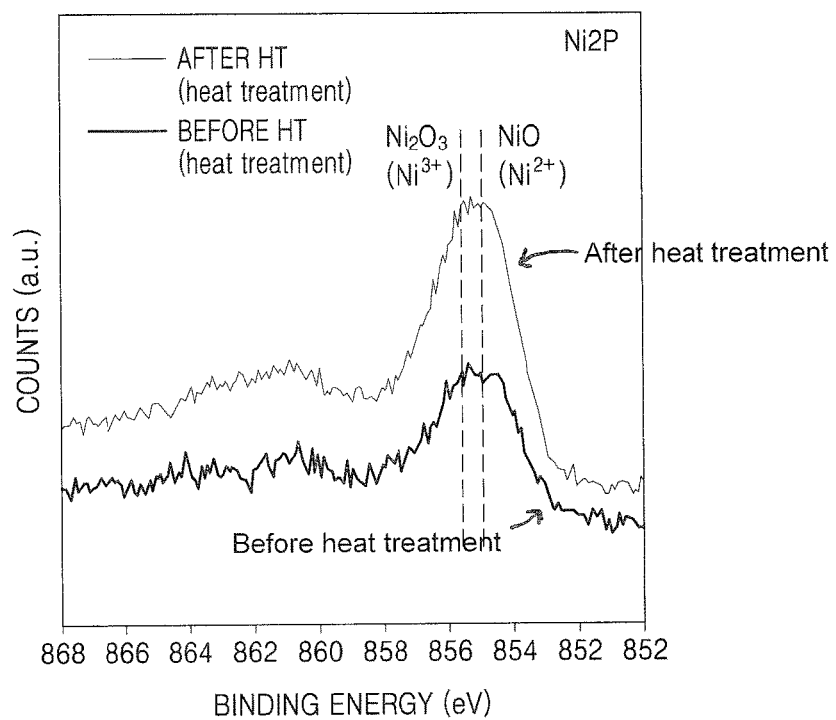
FIGS. 7A to 7F are graphs of counts (arbitrary units, a.u.) versus binding energy (electron volts, eV) each showing a different region of an X-ray optical spectrum of a composite cathode active material prepared in Example 16 in a state before and after performing a second heat treatment.
Figure 7B:
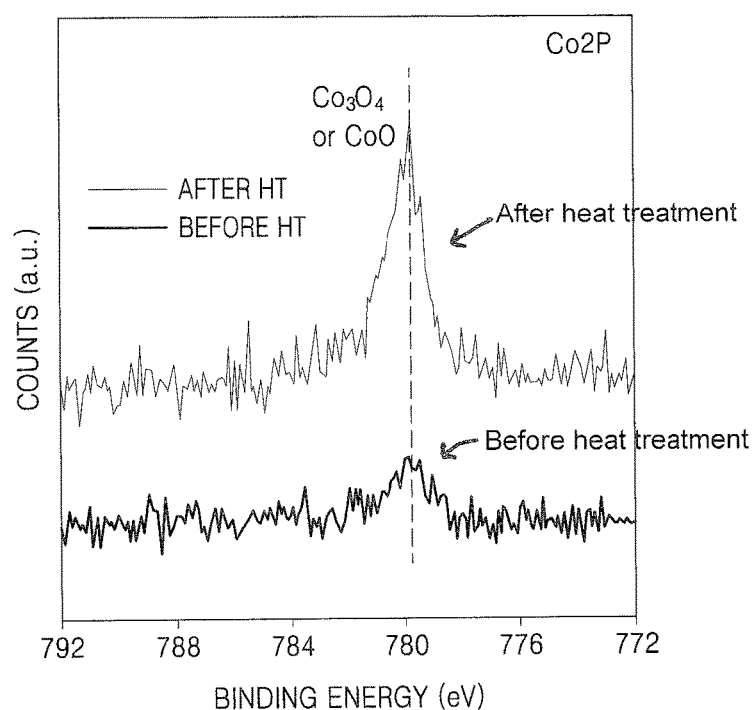
Figure 7C:
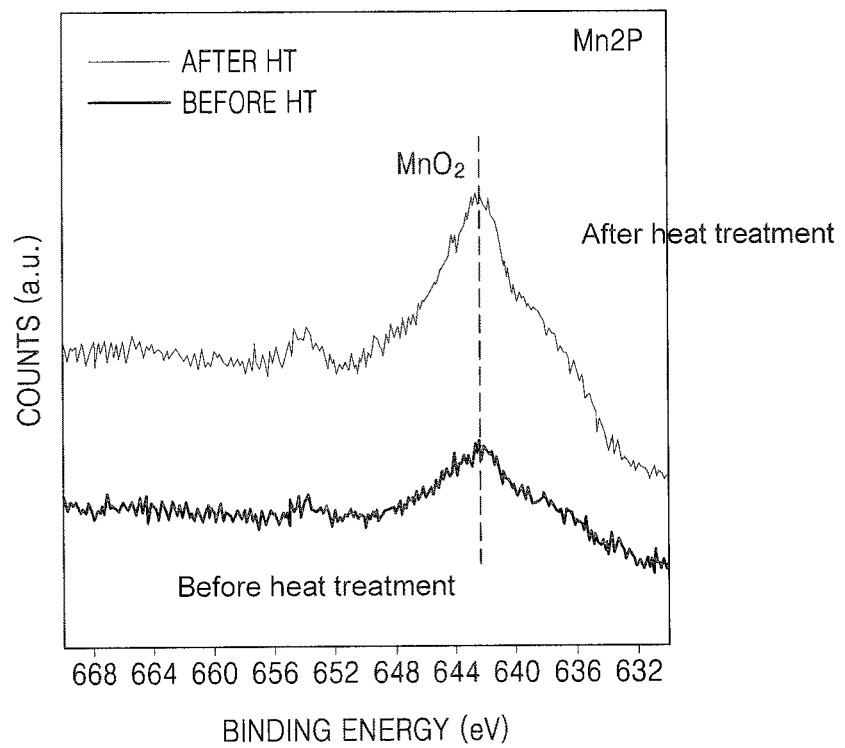
Figure 7D:
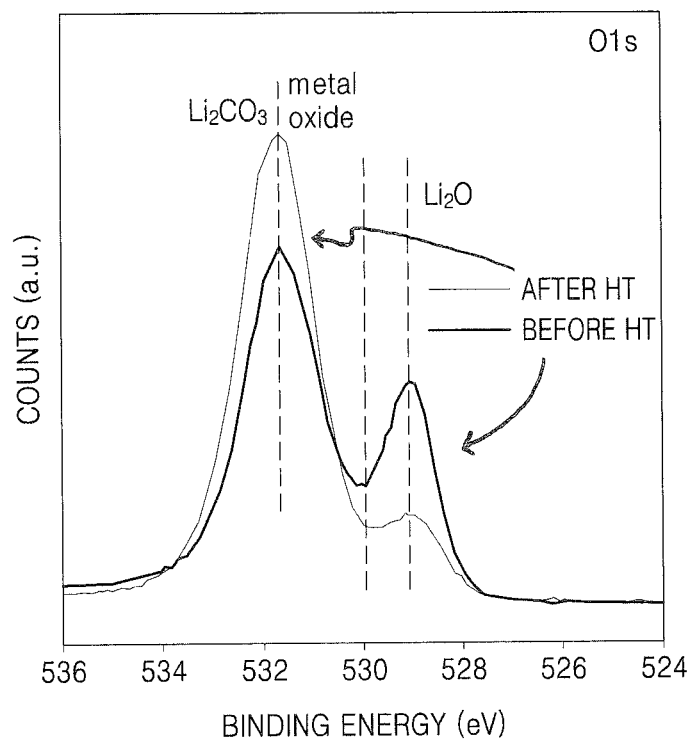
Figure 7E:
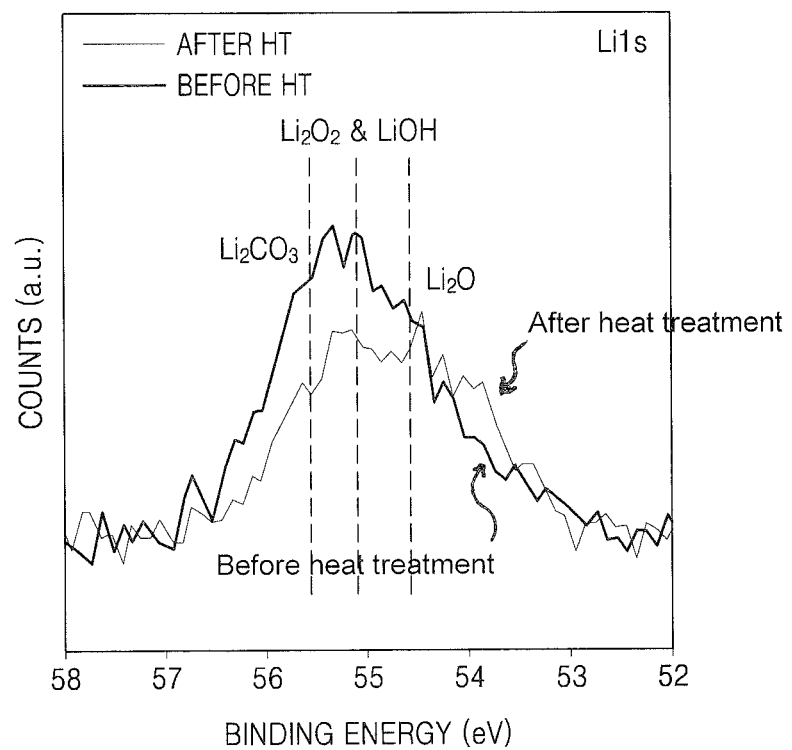
Figure 7F:
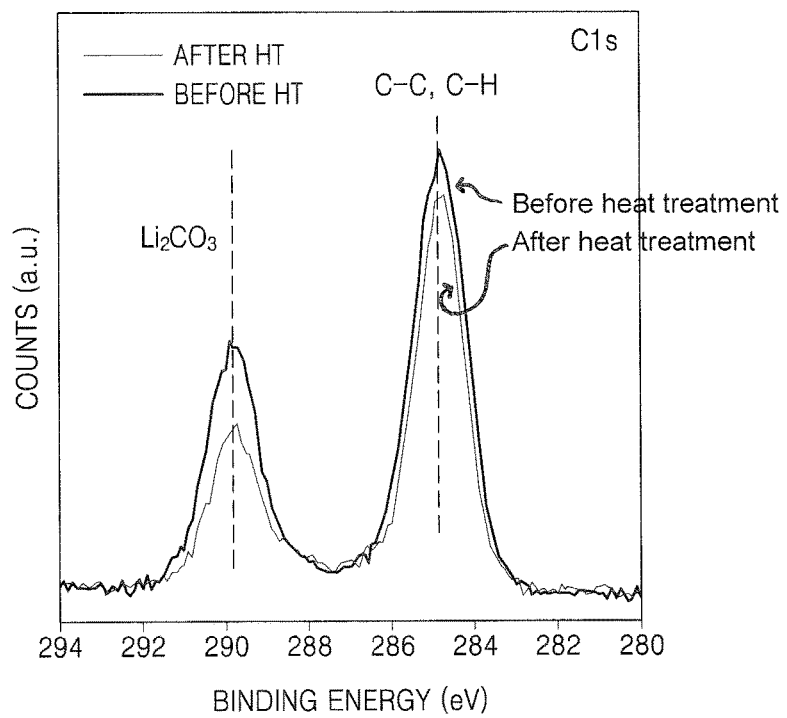

The cross-section of each of the composite cathode active materials prepared in Example 16 and Comparative Example 4 was analyzed using a scanning electron microscope, and results are shown in FIGS. 5 and 6. FIG. 5 is an SEM image showing a cross-section of a composite cathode active material prepared in Comparative Example 4, and FIG. 6 is an SEM image showing a cross-section of a composite cathode active material prepared in Example 16.

Referring to FIGS. 5 and 6, the composite cathode active materials prepared in Example 16 and Comparative Example 4 each had porosity due to pores therein. The pore size (e.g., diameter) of the composite cathode active material prepared in Example 16 (as shown in FIG. 6) including the second metal oxide was smaller than the pore size of the composite cathode active material prepared in Comparative Example 4 as shown in FIG. 5.

That is, referring to FIG. 6, it was confirmed that the pore diameter was reduced by the introduction of the second metal oxide to the surface of the pores.

Evaluation Example 7: X-Ray Photoelectron Spectroscopy (XPS)

FIGS. 7A to 7F are graphs of an X-ray optical spectrum of the composite cathode active material prepared in Example 16 in a state before and after performing the second heat treatment. Each of FIGS. 7A to 7F shows a different region of the X-ray optical spectrum as measured by X-ray spectroscopy.

Referring to FIGS. 7A to 7F, the amount of metallic substances in the composite cathode active material was relatively increased, and the concentration of $Li_2CO_3$ decreased while the concentration of $Li_2O$ increased. Therefore, it was confirmed that the binding of $Li_2O$ to the surface was increased so that the amounts of lithium binding to oxygen also increased, thereby showing a decrease in the amount of $Li_2CO_3$, which is considered as a source for residual lithium. Consequently, a decrease in the amount of residual lithium on the surface of the composite cathode active material prepared in Example 16 was confirmed. That is, without being limited by theory it is believed that the decrease in the amount of residual lithium is associated with the formation of the second metal oxide, where the second metal oxide is formed by a reaction between the precursor of the second metal oxide and residual lithium present on the surface.

Evaluation Example 8: Evaluation on Gas Generation at High Temperature (85° C.)

Lithium batteries were each prepared in the same manner as described for the Preparation of lithium battery 2 using the composite cathode active materials prepared in Example 1 (SOLO/Co), Example 6 (SOLO/V), Example 11 (SOLO/Mn), and Comparative Example 4 (SOLO).

Then, in the $1^{st}$ cycle, the lithium batteries were each charged with a constant current at a rate of 0.1 C at a temperature of 25° C. until a voltage reached 4.35 V (vs. Li), and subsequently cut-off with a current at a rate of 0.05 C while the voltage was maintained at 4.35 V in a constant voltage mode. Then, the lithium batteries were each discharged with a constant current at a rate of 0.1 C until a voltage reached 2.8 V (vs. Li).

In the $2^{nd}$ cycle, the lithium batteries were each charged with a constant current at a rate of 0.33 C at a temperature of 25° C. until a voltage reached 4.35 V (vs. Li), and subsequently cut-off with a current at a rate of 0.05 C while the voltage was maintained at 4.35 V in a constant voltage mode. Then, the lithium batteries were each discharged with a constant current at a rate of 0.2 C until a voltage reached 2.8 V.

In the $3^{rd}$ cycle, the lithium batteries were each charged with a constant current at a rate of 0.33 C at a temperature of 25° C. until a voltage reached 4.35 V (vs. Li), and subsequently cut-off with a current at a rate of 0.05 C while the voltage was maintained at 4.35 V in a constant voltage mode.

Then, the charged lithium batteries were stored in an oven at a temperature of 85° C. for 40 hours. After the lithium batteries were taken out of the oven, the lithium batteries were charged into a jig to allow them to explode, where the jig is disposed within a closed chamber. Here, the gas generation was determined by measuring changes in an inner gas pressure of the closed chamber in terms of volume. The evaluation results are shown in Table 6.

TABLE 7

|  | Gas generation [mL/g, active material] |
|---|---|
| Example 1 (SOLO/Co) | 1.73 |
| Example 6 (SOLO/V) | 1.86 |
| Example 11 (SOLO/Mn) | 2.29 |
| Comparative Example 4 (SOLO) | 2.57 |

Referring to Table 7, it was confirmed that less gas generation occurred in the lithium batteries including the composite cathode active materials prepared in Examples 1, 6, and 11 than in the lithium battery including the composite cathode active material prepared in Comparative Example 4.

That is, without being limited by theory, it is believed that the decrease in the gas generation may be a result of a decrease in the amount of free lithium that is disposed on the surface of the composite cathode active materials and inside the composite cathode active materials. It is also believed that the improved structural stability of the composite cathode active materials may prevent cracks from being generated therein during a charging/discharging process, thereby causing less of a reaction between the composite cathode active material and an electrolyte in the battery.

As described above, according to one or more embodiments of the present disclosure, when a composite cathode active material includes a second metal oxide having a composite crystalline phase on a surface of the composite cathode active material and/or inside the composite cathode active material, a lithium battery including the composite cathode active material may exhibit improved charge-discharge characteristics and generation of gas may be prevented.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material comprising:
   a first metal oxide comprising a plurality of layered crystalline phases comprising a first layered crystalline phase and a second layered crystalline phase, wherein the first and second layered crystalline phases have a different compositions than each other; and
   a second metal oxide comprising a composite crystalline phase, wherein the composite crystalline phase is different from at least one of the plurality of layered crystalline phases of the first metal oxide,
   wherein the second metal oxide is represented by Formula 1,
   wherein at least a portion of the second metal oxide is disposed on a first layered crystalline phase of the plurality of layered crystalline phases of the first metal oxide, and
   wherein the first layered crystalline phase is in a space group of R-3m:

$$Li_xM_yO_z \qquad \text{Formula 1}$$

wherein, in Formula 1, 0≤x≤3, 1≤y≤3, and 2≤z≤8, and M is at least one selected from a Group 4 element to a Group 13 element.

2. The composite cathode active material of claim 1, wherein the second metal oxide comprising the composite crystalline phase is disposed on a surface of a particle of the composite cathode active material.

3. The composite cathode active material of claim 2, wherein the composite crystalline phase has a dimension of less than or equal to about 100 nanometers.

4. The composite cathode active material of claim 1, wherein the second metal oxide comprising the composite crystalline phase is disposed at a grain boundary of the first metal oxide and inside the composite cathode active material.

5. The composite cathode active material of claim 1, wherein the composite cathode active material comprises a pore within the composite cathode active material.

6. The composite cathode active material of claim 5, wherein each pore has a maximum diameter of about 500 nanometers.

7. The composite cathode active material of claim 5, wherein the second metal oxide comprising the composite crystalline phase is disposed in the pore.

8. The composite cathode active material of claim 1, wherein the composite cathode active material comprises lithium in an amount of less than or equal to about 3,000 parts per million.

9. The composite cathode active material of claim 1, wherein an amount of metal in the second metal oxide is in a range of about 0.01 mole percent to about 3 mole percent, based on a total amount of a metal in the first metal oxide.

10. The composite cathode active material of claim 1, wherein the first metal oxide is represented by Formula 2:

$$Li_aNi_bCo_cMn_dO_2 \qquad \text{Formula 2}$$

wherein, in Formula 2, $1.0 \leq a \leq 1.2$, $0.7 < b < 1.0$, $0 < c < 0.3$, and $0 < d < 0.3$.

11. The composite cathode active material of claim 1, wherein the plurality of layered crystalline phases of the first metal oxide comprises a second layered crystalline phase in a space group of C2/m.

12. The composite cathode active material of claim 1, wherein the plurality of layered crystalline phases of the first metal oxide comprises a second layered crystalline phase having a composition represented by Formula 3:

$$Li_2MnO_3. \qquad \text{Formula 3}$$

13. The composite cathode active material of claim 12, wherein an amount of the second layered crystalline phase is greater than or equal to about 3 weight percent, based on a total weight of the composite cathode active material.

14. The composite cathode active material of claim 1, wherein the second metal oxide is represented by Formula 5:

$$Li_xM'_yO_z \qquad \text{Formula 5}$$

wherein, in Formula 5, $0 \leq x \leq 3$, $1 \leq y \leq 3$, and $2 \leq z \leq 8$, and M' is at least one selected from manganese, vanadium, chromium, iron, cobalt, nickel, zirconium, rhenium, aluminum, boron, germanium, ruthenium, tin, titanium, niobium, molybdenum, and platinum.

15. The composite cathode active material of claim 1, wherein the second metal oxide is at least one selected from $Li_3VO_8$, $V_2O_5$, $LiV_3O_8$, $LiMn_2O_4$, $Li_2MnO_3$, $LiNi_{0.5}Mn_{1.5}O_4$, $LiCo_{1-x}Ma_xO_2$ where $0 \leq x < 1$ and Ma is a transition metal, $LiNi_{1-x}Ma_xO_2$ where $0 \leq x < 1$ and Ma is a transition metal, and $LiMn_{1-x}Ma_xO_2$ where $0 \leq x < 1$ and Ma is a transition metal.

16. A cathode comprising a composite cathode active material of claim 1.

17. A lithium battery comprising the cathode of claim 16.

18. A method of preparing a composite cathode active material, the method comprising:
providing a first metal oxide comprising a plurality of layered crystalline phases, wherein each layered crystalline phase of the plurality of layered crystalline phases has a different composition than any other layered crystalline phase of the plurality of layered crystalline phases;
combining the first metal oxide and a precursor of a second metal oxide to form a mixture, wherein the second metal oxide is represented by Formula 1;
drying the mixture; and
heat-treating the dried mixture to form the composite cathode active material:

$$Li_xM_yO_z \qquad \text{Formula 1}$$

wherein, in Formula 1, $0 < x < 3$, $1 < y < 3$, and $2 < z < 8$, and M is at least one selected from a Group 4 element to a Group 13 element.

19. The method of claim 18, wherein the precursor of the second metal oxide comprises a material which does not comprise lithium.

20. The method of claim 18, wherein the drying or heat-treating of the mixture is performed in an oxygen atmosphere at a temperature in a range of about 200° C. to about 800° C. for about 2 hours to about 40 hours.

* * * * *